US012792064B2

(12) United States Patent
Yoon et al.

(10) Patent No.: US 12,792,064 B2
(45) Date of Patent: Nov. 10, 2026

(54) METHOD AND SYSTEM FOR CONTROLLING A PLURALITY OF ROBOTS TRAVELING THROUGH A SPECIFIC AREA, AND BUILDING IN WHICH ROBOTS ARE DISPOSED

(71) Applicant: NAVER LABS Corporation, Seongnam-si (KR)

(72) Inventors: Younghwan Yoon, Seongnam-si (KR); Kay Park, Seongnam-si (KR); Jin Yong Kim, Seongnam-si (KR); Jinyoung Choi, Seongnam-si (KR); Jung-Eun Kim, Seongnam-si (KR)

(73) Assignee: NAVER Corporation, Seongnam-si (KR)

( * ) Notice: Subject to any disclaimer, the term of this patent is extended or adjusted under 35 U.S.C. 154(b) by 0 days.

(21) Appl. No.: 18/502,757

(22) Filed: Nov. 6, 2023

(65) Prior Publication Data

US 2024/0069571 A1 Feb. 29, 2024

Related U.S. Application Data

(63) Continuation of application No. PCT/KR2022/000225, filed on Jan. 6, 2022.

(30) Foreign Application Priority Data

May 6, 2021 (KR) ........................ 10-2021-0058461

(51) Int. Cl.
*G05D 1/698* (2024.01)
*G05D 1/246* (2024.01)
(Continued)

(52) U.S. Cl.
CPC ........... *G05D 1/6983* (2024.01); *G05D 1/693* (2024.01); *G05D 1/246* (2024.01); *G05D 2107/50* (2024.01); *G05D 2109/10* (2024.01)

(58) Field of Classification Search
CPC .......... G05D 1/69–6987; G05D 1/0287–0297; G05D 1/00; G01C 21/00
(Continued)

(56) References Cited

U.S. PATENT DOCUMENTS

2006/0095160 A1* 5/2006 Orita .................... G05D 1/0274 700/248
2017/0274531 A1* 9/2017 Johnson ............... G06Q 10/087
(Continued)

FOREIGN PATENT DOCUMENTS

CN 111645675 A * 9/2020 ............ B60W 10/18
CN 112388624 A 2/2021
(Continued)

OTHER PUBLICATIONS

Chen Z—English Description of WO-2021027964-A1 via Espacenet Patent Translate, retrieved Jun. 3, 2024 (Year: 2024).*
(Continued)

*Primary Examiner* — Erin M Piateski
*Assistant Examiner* — Paul Allen
(74) *Attorney, Agent, or Firm* — GREER BURNS & CRAIN, LTD.

(57) ABSTRACT

Provided is a method for controlling, in a space where a plurality of robots autonomously travel, the robots such that each of the plurality of robots can successively pass through a designated region, by identifying the designated region to be passed through by the robots and i) controlling the robots to pass through the corresponding designated region via a first point defined in the designated region or ii) triggering a designated region traveling mode of the robots and controlling the robots to pass through the corresponding designated region in the designated region traveling mode.

10 Claims, 16 Drawing Sheets

(51) Int. Cl.

| | |
|---|---|
| ***G05D 1/693*** | (2024.01) |
| ***G05D 107/50*** | (2024.01) |
| ***G05D 109/10*** | (2024.01) |

(58) Field of Classification Search

USPC .................................................. 701/300–302

See application file for complete search history.

(56) References Cited

U.S. PATENT DOCUMENTS

| | | | | |
|---|---|---|---|---|
| 2017/0282368 | A1* | 10/2017 | Johnson | G06Q 10/087 |
| 2019/0206268 | A1* | 7/2019 | Taveira | G08G 5/045 |
| 2019/0318950 | A1* | 10/2019 | Takahara | B61L 23/14 |
| 2020/0216060 | A1* | 7/2020 | Pontisakos | B60W 10/20 |
| 2022/0236742 | A1* | 7/2022 | Oda | G06Q 10/083 |
| 2022/0253072 | A1* | 8/2022 | Oda | G05D 1/0297 |
| 2022/0260997 | A1* | 8/2022 | Iio | G05D 1/0214 |
| 2022/0262183 | A1* | 8/2022 | Oda | G07C 9/38 |
| 2023/0242166 | A1* | 8/2023 | Matsumoto | B65G 1/137<br>246/28 R |
| 2023/0333562 | A1* | 10/2023 | Al | B65G 1/137 |

FOREIGN PATENT DOCUMENTS

| | | | | |
|---|---|---|---|---|
| JP | 1999-296228 A | | 10/1999 | |
| JP | 2000-132233 A | | 5/2000 | |
| JP | 2003067054 A | * | 3/2003 | |
| JP | 2010134581 A | | 6/2010 | |
| JP | 2010231698 A | | 10/2010 | |
| KR | 1020050024840 | | 3/2005 | |
| KR | 20130045289 A | | 5/2013 | |
| KR | 20150137166 A | | 12/2015 | |
| WO | 0223297 A1 | | 3/2002 | |
| WO | WO-2021027964 A1 | * | 2/2021 | B25J 13/00 |

OTHER PUBLICATIONS

Y. Hada, K. Takase, K. Ohgaki, K. Matsukuma, R. Hirata and S. Okumura, “Indoor navigation of multiple mobile robots in a dynamic environment using iGPS,” Proceedings 2002 IEEE International Conference on Robotics and Automation (Cat. No.02CH37292), Washington, DC, USA, 2002, pp. 2682-2688 vol.3, (Year: 2002).*

Harasaki K—English description of JP-2003067054-A via Espacenet Patent translate, retrieved Apr. 15, 2025. (Year: 2025).*

Wang, Hao—English description of CN-111645675-A via Espacenet Patent Translate, retrieved Aug. 18, 2025. (Year: 2025).*

Written Opinion of the International Search Report for PCT Application PCT/KR2022/000225, dated Apr. 13, 2022.

* cited by examiner

METHOD AND SYSTEM FOR CONTROLLING A PLURALITY OF ROBOTS TRAVELING THROUGH A SPECIFIC AREA, AND BUILDING IN WHICH ROBOTS ARE DISPOSED

BACKGROUND OF THE INVENTION

The following description relates to a method and system for controlling a plurality of robots driving in a specific area, such as a confined area.

A self-driving robot refers to a robot that finds an optimal route to a destination using wheels or legs while looking around on its own and detecting obstacles, and such a robot is being developed and used in various fields, such as in the fields of self-driving vehicles, logistics, hotel services, and robot cleaners.

To provide various services, a plurality of robots may be operated within a space, such as within a building. When the plurality of robots is operated in the space, there are cases in which the robots need to travel, that is, drive within a confined area, such as a narrow passage/corridor, within a building. When the plurality of robots are densely located within a confined area, the probability of collision and interference between robots or collision and interference between robots and objects may increase. This may degrade movement efficiency of the robots, and accordingly may make service provision by the robots inefficient.

Therefore, when the robots travel, that is drive within the confined area, there is a need for a robot control method and system to coordinate movement of the robots such that the robots may efficiently pass through the confined area.

Korean Patent Laid-Open Publication No. 10-2005-0024840 relates to technology for a route planning method for an autonomously moving robot, and describes a method of planning an optimal route through which a mobile robot autonomously moving (at home or in an office) may safely and quickly move to a destination while avoiding obstacles.

The aforementioned information is provided to help understanding and may include contents that do not form a portion of the related art, and may not include contents that the related art may propose to one of ordinary skill in the art.

BRIEF SUMMARY OF THE INVENTION

Example embodiments provide a method that may identify a specific area through which robots are to pass in a space in which the robots autonomously drive; may i) control a robot to pass through the specific area via a first point defined in the specific area, or ii) trigger a specific area driving mode of the robot and control the robot to pass through the specific area in the specific area driving mode; and may control each of the plurality of robots to sequentially pass through the specific area.

Example embodiments provide a robot control method that allows a robot control system to centrally control robots based on resource management corresponding to a specific area such that robots may sequentially pass through the specific area without interference, when the plurality of robots are controlled to pass through the specific area, such as a confined area.

Example embodiments provide a robot control method that may trigger a specific area driving mode for each robot such that each robot may sequentially pass through a specific area according to the specific area driving mode, when a plurality of robots are controlled to pass through the specific area, such as a confined area.

According to one aspect, there is provided a robot control method performed by a robot control system that controls a plurality of robots moving within a space, the robot control method including identifying a specific area through which the robots are to pass; for a first robot that enters the specific area among the plurality of robots, i) controlling the first robot to pass through the specific area via a first point defined in the specific area by the robot control system, or ii) triggering a specific area driving mode of the first robot and controlling the first robot to pass through the specific area in the specific area driving mode; and controlling each robot entering the specific area after the first robot among the plurality of robots to sequentially pass through the specific area.

The specific area may be a section within the space through which each of the plurality of robots is required to sequentially pass in line.

The controlling of the first robot may include identifying that the first robot is located in an entry area of the specific area; and controlling the first robot to move to the first point, the first point may be a point to which the first robot is movable and be a point located next to a point occupied by another robot among points defined in the specific area or a point farthest from the entry area among the points defined in the specific area, and the controlling of the each robot may include identifying that a second robot is located in the entry area after the first robot among the plurality of robots; and controlling the second robot to move to a second point located next to the first point occupied by the first robot among the points defined in the specific area.

The controlling of each of the robots may include controlling the second robot to move to the first point if the first robot moves within the specific area and does not occupy the first point.

The controlling of the first robot to move to the first point may include assigning the first point to the first robot as an available point for the first robot among the points defined in the specific area; and controlling the first robot to move to the assigned first point, the controlling of the second robot to move to the second point may include assigning the second point to the second robot as an available point for the second robot among the points defined in the specific area; and controlling the second robot to move to the assigned second point, and the controlling of the second robot to move to the first point may include assigning the first point to the second robot as an available point for the second robot among the points defined in the specific area; and controlling the second robot to move to the assigned first point.

The first point and the second point may be points predefined within the specific area, the robot control method may further include acquiring occupancy information indicating whether each of the points is occupied by any of the robots, and an available point for the first robot and the second robot may be assigned based on the occupancy information.

The first point and the second point may be points dynamically defined in the specific area, and the second point may be defined to be separate from the first point by a distance that is determined based on at least one of attribute information of the first robot and attribute information of the second robot.

The first robot may be a robot that first enters the entry area among the plurality of robots, the first point may be the point farthest from the entry area among the points defined in the specific area, and the second point may be a farthest point next to the first point from the entry area among the points defined in the specific area.

The controlling of the first robot may include controlling the first robot to exit the specific area from an exit location of the specific area based on situation information outside the specific area, and a second robot that enters the specific area after the first robot may be controlled to move to a location occupied by the first robot and then controlled to exit the specific area from the exit location based on the situation information.

The controlling of the first robot may include identifying that the first robot is located in an entry area of the specific area; and triggering the specific area driving mode of the first robot, and in the specific area driving mode, the first robot may be controlled to directly move to an exit location of the specific area if another robot is from absent within the specific area, and the first robot may be controlled to move to a location separate from the other robot present in the specific area by a predetermined distance if the other robot is present within the specific area.

The controlling of the first robot may include disabling the specific area driving mode when the first robot reaches the exit location of the specific area.

The controlling of the each robot may include identifying that a second robot is located in the entry area after the first robot among the plurality of robots; and triggering a specific area driving mode of the second robot, and in the specific area driving mode, the second robot may be controlled to a location separated from the first robot by a predetermined distance if the first robot is present within the specific area and to move to an empty space within the specific area as the first robot moves in the specific area.

In the specific area driving mode, the first robot and the second robot may be controlled to pass through the specific area by imitating a motion of a plurality of persons sequentially passing through a confined area in a line.

In the specific area driving mode, the first robot may be controlled to identify another robot that is ahead of it in the specific area, to move to a location separated from the identified other robot by a predetermined distance, and to move to the exit location as the identified other robot moves, without receiving an instruction for controlling the first robot from the robot control system.

According to another aspect, there is provided a robot control system that controls a plurality of robots moving within a space, the robot control system including at least one processor configured to execute a computer-readable instruction. The at least one processor is configured to identify a specific area through which the robots are to pass, and for a first robot that enters the specific area among the plurality of robots, to: i) control the first robot to pass through the specific area via a first point defined in the specific area by the robot control system, or ii) trigger a specific area driving mode of the first robot for controlling the first robot to pass through the specific area in the specific area driving mode, and to control each robot entering the specific area after the first robot among the plurality of robots to sequentially pass through the specific area.

According to another aspect, there is provided a method of controlling a robot moving within a space to provide a service, the method including moving to an entry area of a specific area through which the robot is to pass under control from a robot control system that controls a plurality of robots including the robot; changing an autonomous driving mode of the robot to a specific area driving mode in response to a trigger by the robot control system; determining whether another robot is already present within the specific area; directly moving to an exit location of the specific area if another robot is absent within the specific area and moving to a location separated from the other robot by a predetermined distance if the other robot is present; moving to the exit location of the specific area by moving to an empty space within the specific area as the other robot moves if the other robot is present; and changing from the specific area driving mode to the autonomous driving mode under control from the robot control system upon arrival at the exit location.

According to some example embodiments, when a plurality of robots are controlled to pass through a specific area, such as a confined area, each of the robots may sequentially pass through the specific area while minimizing collision and interference between the robots or collision and interference between the robots and objects.

According to some example embodiments, robots may be centrally controlled to efficiently pass through a specific area based on resource management of a robot control system for the specific area within a space in which the plurality of robots travels, that is, drives.

According to example embodiments, since a robot control system triggers a specific area driving mode for each robot entering a specific area, such as a confined area, each robot may be controlled to efficiently pass through the specific area in consideration of another robot within the specific area through the specific area driving mode.

DETAILED DESCRIPTION OF THE INVENTION

Hereinafter, example embodiments will be described with reference to the accompanying drawings.

Figure 1:
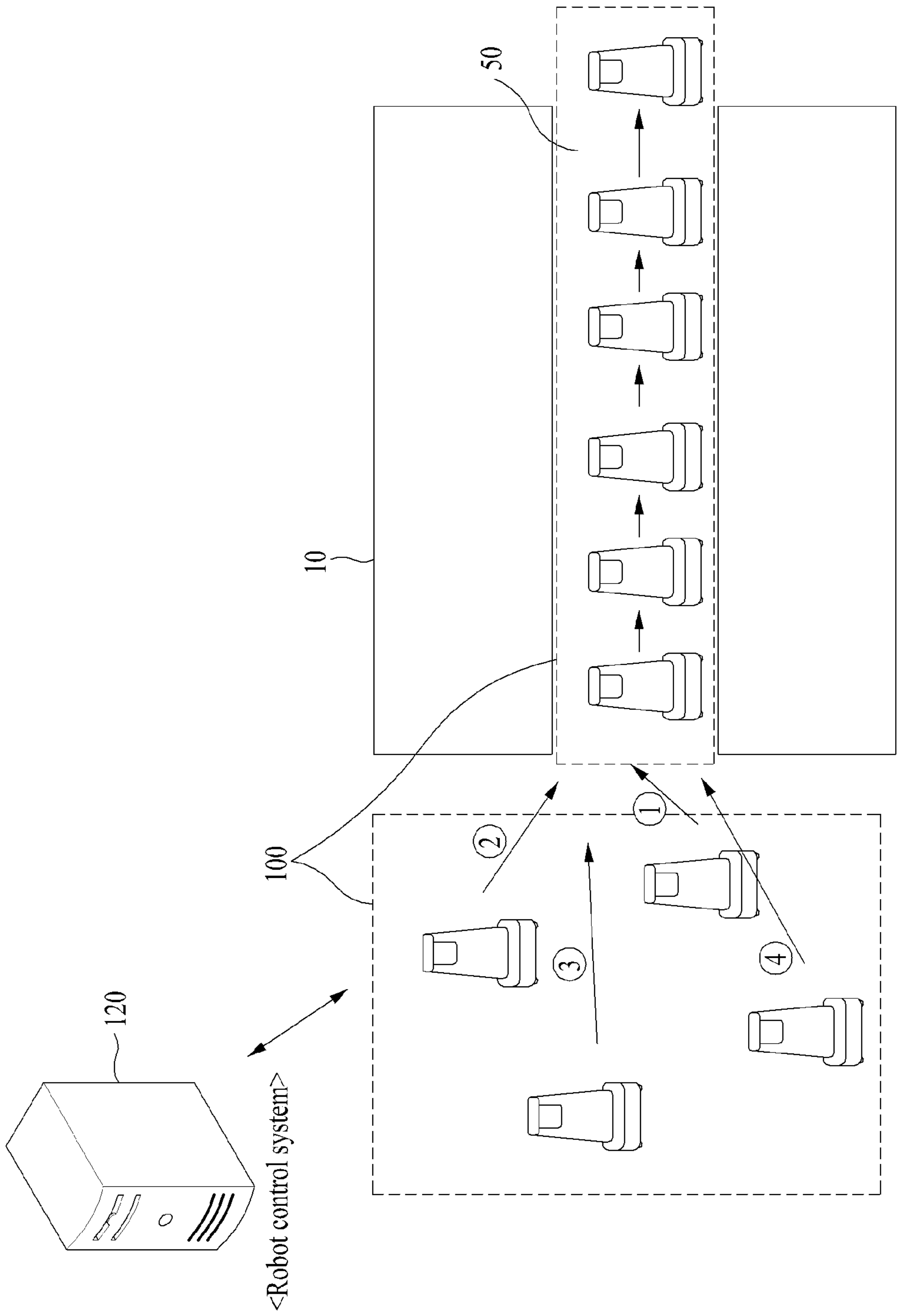
FIG. 1 illustrates a method of controlling a plurality of robots to pass through a specific area, such as a confined area, within a space according to an example embodiment.

FIG. 1 illustrates a method of controlling a plurality of robots to pass through a specific area, such as a confined area, in a space according to an example embodiment.

FIG. 1 illustrates a method of controlling the passing, by a plurality of robots 100 configured to provide services within a space 10, through a specific area 50 (i.e., drive in and exit the specific area 50) within the space 10 under control from a robot control system 120.

The space 10 may represent a place in which the robots 100 provide services, for example, the space may comprise a building. The building refers to a space in which a plurality of persons (hereinafter, also referred to as users) works or resides and may include a plurality of partitioned spaces. The space 10 may represent a part of the building (such as a specific floor or a partial space within a corresponding floor).

The robots 100 may be service robots used to provide services in the space 10. The robots 100 may be configured to provide services on at least one floor in the space 10. As illustrated, the number of robots 100 may be plural. Each of the robots 100 may move in the space 10, and may provide a service at an appropriate location or to an appropriate user in the space 10.

Services provided from the robots 100 may include, for example, at least one of the following: a parcel delivery service, an order-based beverage delivery service for delivering beverages such as coffee, etc., a cleaning service, and other information/content providing services.

The robots 100 may provide services at a predetermined location or to a predetermined user in the space 10 through autonomous driving. Movement and service provisions of each of the robots 100 may be controlled by the robot control system 120. A structure of the robot control system 120 will be further described below with reference to FIGS. 3 to 5. The robots 100 may move to a predetermined location or a predetermined user by driving along a route set by the robot control system 120, and accordingly the robots may provide services at the predetermined location or to the predetermined user.

Referring to FIG. 1, the specific area 50 may be included in the space 10. The specific area 50 may be a confined area (confined/narrow area) and may be, for example, an area with a somewhat narrow width for the robots 100 to travel or with restriction for the plurality of robots to simultaneously travel. For example, the specific area 50 may be a section within the space 10 in which each of the plurality of robots 100 are required to sequentially pass in a line. That is, the specific area 50 refers to a part of a route through which the robots 100 need to travel, and may represent a section in which each of the robots 100 is required to sequentially pass in a line. The number of such specific areas 50 may be plural in the space.

In an example embodiment, the robot control system 120 may identify the specific area through which the robots 100 need to pass within the space 10 in which the robots 100 autonomously drive. The robot control system 120 may i) control a robot to pass through the corresponding specific area 50 via a first point defined in the specific area 50, or ii) trigger a specific area driving mode for each of the robots 100 and control the robots such that each of the robots 100 may sequentially pass through the specific area 50 by controlling the robots 100 to pass through the corresponding specific area 50 in the specific area driving mode.

That is, in an example embodiment, in controlling the robots 100 to pass through the specific area 50 such as the confined area, as in the above i), the robot control system 120 may centrally control the robots 100 based on resource management corresponding to the specific area 50, such that the robots 100 may sequentially pass through the specific area 50 without interference. Alternatively/additionally, in an example embodiment, as in the above ii), the robot control system 120 may trigger the specific area driving mode for each robot of the robots 100 entering the specific area 50 such that each robot may sequentially pass through the specific area 50 according to the specific area driving mode.

For example, as in the illustrated example, in an example embodiment, each of the robots 100 may sequentially pass through the specific area 50 under control of the robots 100 according to i) and/or ii). As illustrated, the robots 100 may sequentially enter the specific area 50 in line and may exit the specific area 50. At an entrance of the specific area 50, the robots may be controlled to enter the specific area 50 sequentially (e.g., in order of ① to ④) and exit the specific area 50 in the order in which they entered.

A method of controlling the robots 100 to pass through the specific area 50 will be further described with reference to FIGS. 2 to 14.

Figure 2:
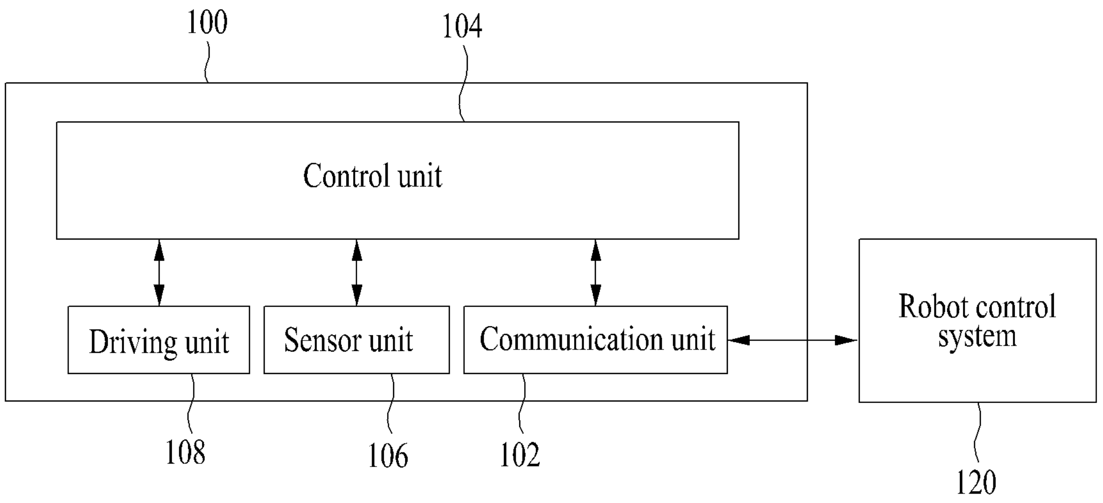
FIG. 2 is a block diagram illustrating a robot that provides a service within a space according to an example embodiment.

FIG. 2 is a block diagram illustrating a robot that provides a service within a space according to an example embodiment.

As described above, the robots 100 may be service robots used to provide services within the space 10. The robots 100 may provide services at a predetermined location or to a predetermined user in the space 10 through autonomous driving.

In the following, for clarity of description, a robot corresponding to any one of the robots 100 will be described by assigning the same reference number "100" as the robots 100.

The robot 100 may be a physical device and, referring to FIG. 2, may include a control unit 104, a driving unit 108, a sensor unit 106, and a communication unit 102.

The control unit 104 may be a physical processor embedded in the robot 100 and, although not illustrated, may include a route planning processing module, a mapping processing module, a driving control module, a localization processing module, a data processing module, and a service processing module. Here, in certain embodiments, the route planning processing module, the mapping processing module, and the localization processing module may be optionally included in the control unit 104 to enable indoor autonomous driving of the robot 100, even though communication with the robot control system 120 is not being performed.

The communication unit 102 may be a component configured for communication between the robot 100 and another device (another robot or the robot control system 120). That is, the communication unit 102 may include a hardware module, such as an antenna, a data bus, a network interface card, a network interface chip, and a networking interface port of the robot 100, or a software module, such as a network device driver or a networking program, to transmit/receive data and/or information to/from the other device.

The driving unit 108 may be a component that enables movement by controlling movement of the robot 100, and may include equipment to perform the same.

The sensor unit 106 may be a component for collecting data required for autonomous driving and service provision of the robot 100. The sensor unit 106 may not include expensive sensing equipment, and may instead include a sensor, such as a low-cost ultrasonic sensor and/or a low-cost camera. The sensor unit 106 may include a sensor for identifying another robot or a person in front and/or behind the robot. For example, the other robot, person, and other objects may be identified through a camera of the sensor unit 106. Alternatively, the sensor unit 106 may include an infrared sensor (or an infrared camera). The sensor unit 106 may further include, in addition to the camera, a sensor for recognizing/identifying a nearby user, other robot, or object.

For example, the data processing module of the control unit 104 may transmit sensing data including output values of sensors of the sensor unit 106 to the robot control system 120 through the communication unit 102. The robot control system 120 may transmit, to the robots 100, route data generated using an indoor map in the space 10. The route data may be transmitted to the data processing module through the communication unit 102. The data processing module may directly transmit the route data to the driving control module, and the driving control module may control indoor autonomous driving of the robots 100 by controlling the driving unit 108 according to the route data.

When the robot 100 and the robot control system 120 are incapable of communicating with each other, the data processing module may transmit sensing data to the localization processing module, and may generate route data through the route planning processing module and the mapping processing module, and may directly process indoor autonomous driving of the robot 100.

The robot 100 may be distinct from a mapping robot used to generate an indoor map in the space 10. Here, the robot 100 does not include expensive sensing equipment and thus, may process indoor autonomous driving using an output value of a sensor, such as a low-cost ultrasonic sensor and/or a low-cost camera. Meanwhile, if the robot 100 has previously processed indoor autonomous driving through communication with the robot control system 120, the robot 100 may perform more accurate indoor autonomous driving while using low-cost sensors by further using mapping data that includes route data previously received from the robot control system 120.

However, in certain example embodiments, the robot 100 may serve as the mapping robot.

The service processing module may receive an instruction received through the robot control system 120 through the communication unit 102 or through the communication unit 102 and the data processing module. The driving unit 108 may further include equipment related to a service provided from the robot 100, as well as equipment for moving the robot 100. For example, to perform a food/parcel delivery service, the driving unit 108 of the robot 100 may include a component for loading food and/or parcels or a component (e.g., robot arm) for delivering food and/or parcels to a user. Also, the robot 100 may further include a speaker and/or a display to provide information/content. The service processing module may transmit a driving command for a service to be provided to the driving control module, and the driving control module may control a component included in the robot 100 or the driving unit 108 according to the driving command such that the service may be provided.

The robot 100 may drive in the specific area 50, such as the confined area, within the space 10 through control of the robot control system 120, and may efficiently pass through the specific area 50 through coordination with other robot(s).

The robot 100 may correspond to a brainless robot in that the robot 100 simply provides sensing data for controlling the robot 100 to the robot control system 120.

Meanwhile, each of the robots 100 may have a different size and shape according to a model or a service intended to be provided.

A configuration and an operation of the robot control system 120 that controls the robots 100 will be further described below with reference to FIGS. 3 to 5.

Description related to technical features made above with reference to FIG. 1 may apply to FIG. 2 and thus, repeated description is omitted.

Figure 3:
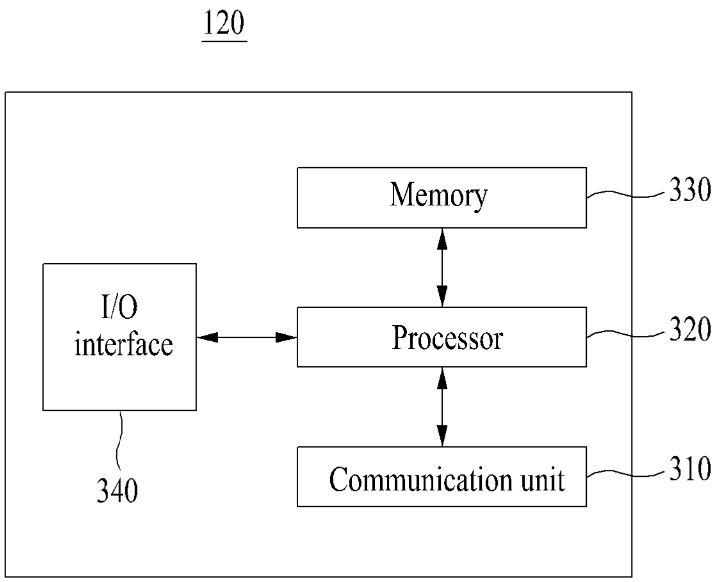
FIGS. 3 to 5 are block diagrams illustrating a robot control system that controls a plurality of robots according to an example embodiment.
Figure 4:
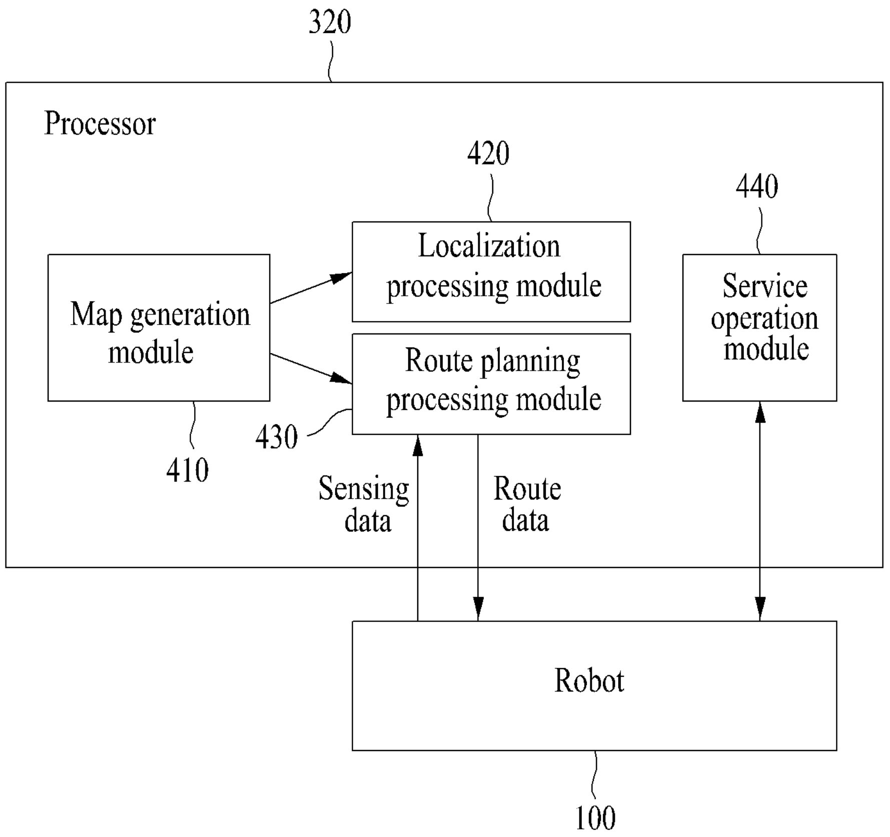
Figure 5:
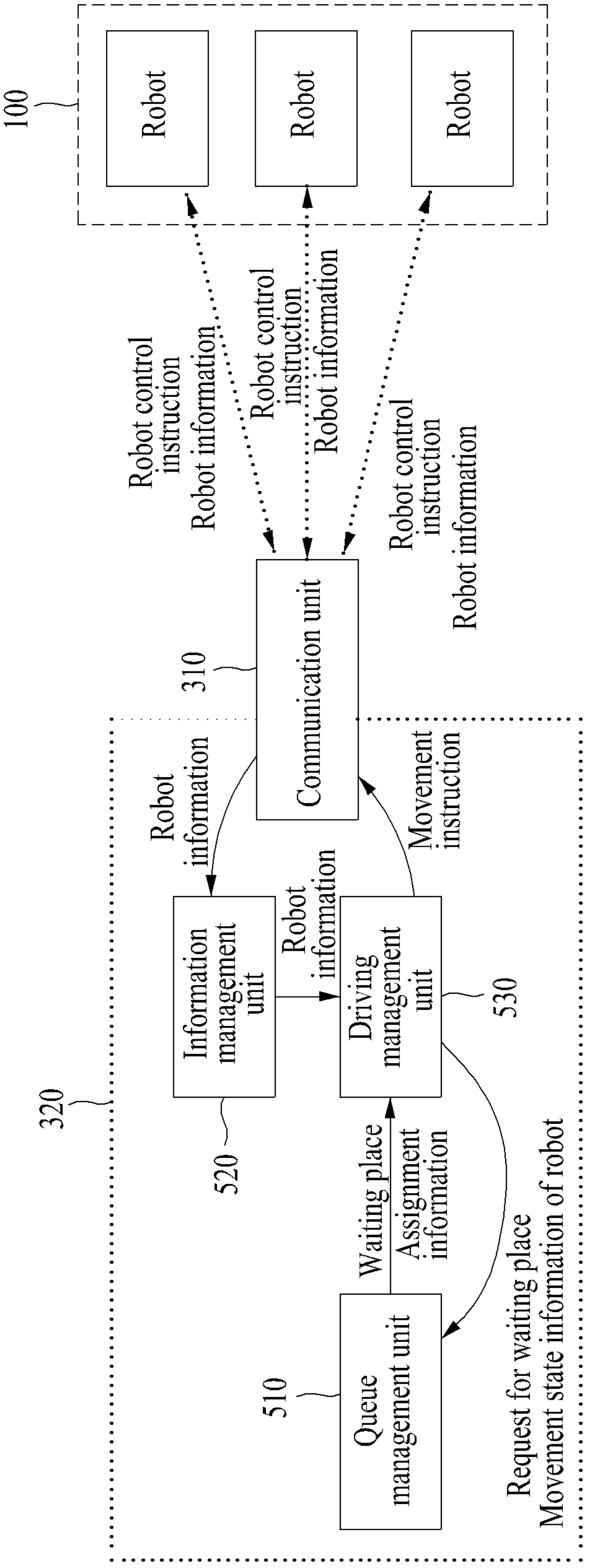

FIGS. 3 to 5 are block diagrams illustrating a robot control system that controls a plurality of robots according to an example embodiment.

The robot control system 120 may be a device that controls movement (i.e., driving) of the robots 100 in the space 10 and provision of services by the robots 100 in the space 10. The robot control system 120 may control movement of each of the plurality of robots 100 and the service provision of each of the robots 100. The robot control system 120 may set a route to be used by the robots 100 to provide services through communication with the robots 100, and may transmit information on the route to the robots 100. The robots 100 may drive based on information on the received route, and may provide services at a predetermined location or to a predetermined user. The robot control system 120 may control movement of a robot such that the robot may move (drive) according to the set route.

The robot control system 120 may include at least one computing device.

As described above, the robot control system 120 may be a device that sets a route for the robots 100 to travel (that is, drive) and controls movement of the robots 100. The robot control system 120 may include at least one computing device and may be implemented as a server (e.g., cloud server) located inside the space 10 or outside of the space 10.

Referring to FIG. 3, the robot control system 120 may include a memory 330, a processor 320, a communication unit 310, and an input/output (I/O) interface 340.

The memory 330 may include a permanent pass storage device, such as random access memory (RAM), read only memory (ROM), and disk drive, as a computer-readable recording medium. Here, ROM and the permanent mass storage device may be separated from the memory 330, and may be included as a separate permanent storage device. Also, an operating system (OS) and at least one program code may be stored in the memory 330. Such software components may be loaded from a computer-readable recording medium separate from the memory 330. The separate computer-readable recording medium may include a computer-readable recording medium, such as a floppy drive, a disk, a tape, a DVD/CD-ROM drive, and a memory card. In another example embodiment, software components may be loaded to the memory 330 through the communication unit 310, instead of through the computer-readable recording medium.

The processor 320 may be configured to process instructions of a computer program by performing basic arithmetic operations, logic operations, and I/O operations. The instructions may be provided from the memory 330 or the communication unit 310 to the processor 320. For example, the processor 320 may be configured to execute an instruction received according to the program code loaded to the memory 330. The processor 320 may include components (410 to 440) of FIG. 4 and components (510 to 530) of FIG. 5.

Each of the components (410 to 440 and 510 to 530) of the processor 320 may be a software module and/or a hardware module as a part of the processor 320, and may represent a function (functional block) implemented by the processor 320. The components (410 to 440 and 510 to 530) of the processor 320 will be further described with reference to FIGS. 4 and 5.

The communication unit 310 may be a component for communication between the robot control system 120 and another device (robots 100 or another server). That is, the communication unit 310 may include a hardware module, such as an antenna, a data bus, a network interface card, a network interface chip, and a networking interface port of the robot 100, or a software module, such as a network device driver or a networking program, to transmit/receive data and/or information to/from the other device.

The I/O interface 340 may be a device for interfacing with an input device, such as a keyboard or a mouse, and an output device, such as a display or a speaker.

Also, in other example embodiments, the number of components in the robot control system 120 may be greater than the number of illustrated components.

The components (410 to 440) of the processor 320 will be further described with reference to FIG. 4. Referring to FIG. 4, the processor 320 may include a map generation module 410, a localization processing module 420, a route planning processing module 430, and a service operation module 440. Such components included in the processor 320 are representations of different functions performed by at least one processor included in the processor 320 in response to a control instruction according to a code of an OS or a code of at least one program.

The map generation module 410 may be a component for generating an indoor map of a target facility using sensing data that is generated by a mapping robot (not shown) that autonomously drives inside the space 10 for the target facility (e.g., interior of the space 10).

Here, the localization processing module 420 may determine locations of the robots 100 inside the target facility using sensing data received from the robots 100 through a network and the indoor map of the target facility generated through the map generation module 410.

The route planning processing module 430 may generate a control signal for controlling autonomous indoor driving of the robots 100 using the aforementioned sensing data received from the robots 100 and the generated indoor map. For example, the route planning processing module 430 may generate a route (i.e., route data) for the robots 100. The generated route (route data) may be set for the robots 100 for driving of the robots 100 that follow the corresponding route. The robot control system 120 may transmit information on the generated route to the robots 100 through the network. For example, information on the route may include information indicating current locations of the robots 100, information for mapping the current locations and the indoor map, and route planning information. Information on the route may include information on a route through which the robots 100 need to drive to provide services at a predetermined location or to a predetermined user in the space 10. The route planning processing module 430 may generate the route (i.e., route data) for the robots 100 to drive on at least a portion of exclusive roads designated in the space 10 and may set the route for the robots 100. The robot control system 120 may control movement of the robots 100 such that the robots 100 may move along such a set route (i.e., according to the set route).

The service operation module 440 may include a function for controlling services provided by the robots 100 in the space 10. For example, a service provider that operates the robot control system 120 or the space 10 may provide an integrated development environment (IDE) for a service (e.g., cloud service) provided from the robot control system 120 to a user or a producer of the robots 100. Here, the user or the producer of the robots 100 may produce software for controlling services provided by the robots 100 in the space 10 through the IDE and may register the software to the robot control system 120. In this case, the service operation module 440 may control services provided by the robots 100 using the software registered in association with the corresponding robots 100. In more detail, for example, assuming that the robots 100 provide a service of delivering a user-requested item (e.g., food or a parcel) to a location of the corresponding user, the robot control system 120 may control the robots 100 to move to a location of the corresponding user by controlling indoor autonomous driving of the robots 100 and may transmit a related command to the robots 100 to provide a series of services of delivering the item to the user upon arrival at a destination location and outputting a user response voice.

The components (510 to 530) of the processor 320 for controlling the robots 100 to pass through the specific area 50 will be further described with reference to FIG. 5.

The processor 320 may include a queue management unit 510, an information management unit 520, and a driving management unit 530.

The queue management unit 510 may manage robot occupancy information indicating whether lines or points defined in the space 10 (or the route through which the robots 100 drive) are occupied by the robots 100. For example, the queue management unit 510 may manage robot occupancy information indicating whether points defined in the specific area 50 are occupied by the robots 100. Also, the queue management unit 510 may manage robot occupancy information indicating whether points defined in a congested area (e.g., predefined or determined to be highly congested) in the space 10 (or in the route through which the robots 100 drive). The queue management unit 510 may communicate with a database that stores the robot occupancy information.

The information management unit 520 may manage robot-related information (robot information) as well as a location of each of the robots 100. Information related to the robots 100 may be received from the robots 100 through the communication unit 310. The information management unit 520 may communicate with the database that stores the robot information.

The driving management unit 530 may establish a travel plan for each of the robots 100, may transmit a control instruction to the robots 100 through the communication unit 310, may move the robots 100, and may manage completion of movement and service provision of the robots 100. The driving management unit 530 may correspond to the aforementioned components (420 to 440).

As illustrated, the driving management unit 530 may request assignment of a point (i.e., a waiting point) within the specific area 50 to which a first robot needs to move based on robot information that includes a location of the first robot to enter the specific area 50. The queue management unit 510 may assign a point within the specific area 50 that is not occupied by the robots 100 based on the robot occupancy information as the waiting point for the first robot. The driving management unit 530 may transmit an instruction to the first robot to move to the assigned waiting point such that the first robot may move to the assigned waiting point. The first robot may be controlled to move to the waiting point in response to the instruction from the driving management unit 530 and to pass through the specific area 50.

The robot control system 120 may control each of the plurality of robots 100 to pass through the specific area 50 in a similar manner.

A method of controlling, by the robot control system 120, the plurality of robots 100 to pass through the specific area 50 will be further described with reference to FIGS. 6 to 14.

Description related to technical features made above with reference to FIGS. 1 and 2 may apply to FIGS. 3 to 5 and thus, repeated description is omitted.

In the following detailed description, an operation performed by the components of the robot control system 120 or the robot(s) 100 will be explained as an operation performed by the robot control system 120 or the robot(s) 100 for clarity of description.

Figure 6:
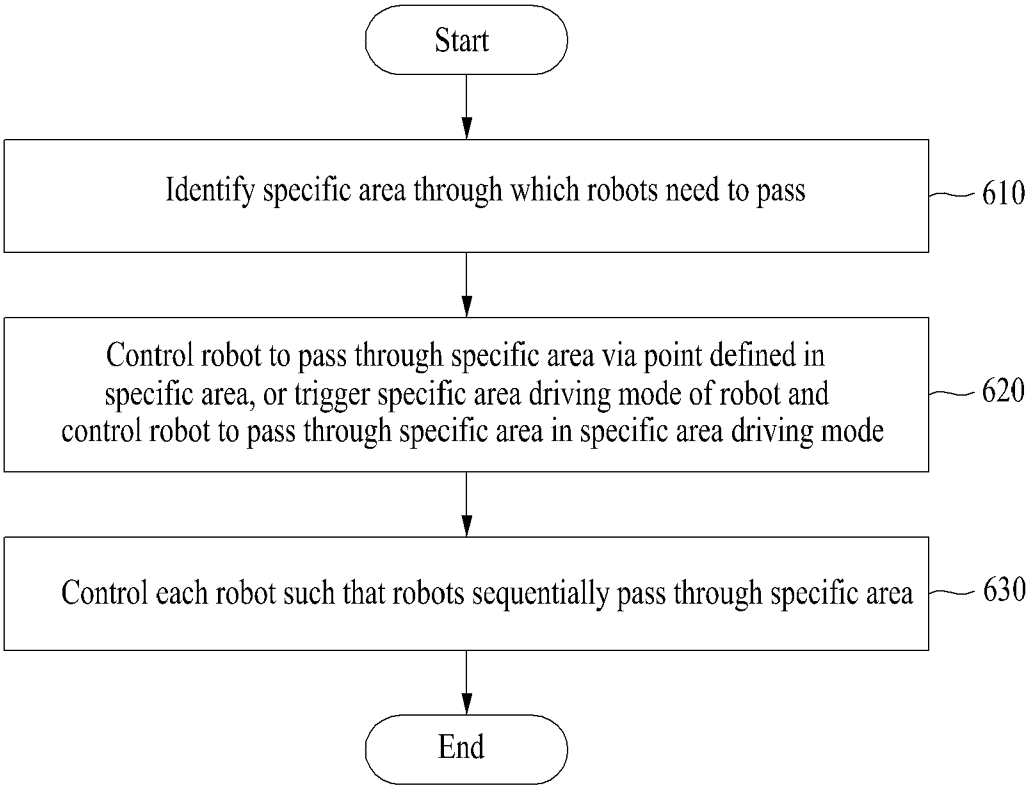
FIG. 6 is a flowchart illustrating a method of controlling a plurality of robots to pass through a specific area, such as a confined area, within a space according to an example embodiment.

FIG. 6 is a flowchart illustrating a method of controlling a plurality of robots to pass through a specific area, such as a confined area, within a space according to an example embodiment.

A method of efficiently passing, by the robots 100, through the specific area 50, such as the confined area, under control from the robot control system 120 will be described with reference to FIG. 6.

In operation 610, the robot control system 120 may identify the specific area 50 through which the plurality of robots 100 needs to pass. For example, the robot control system 120 may identify the specific area 50 through which the robots 100 need to pass from a movement route of each of the robots 100 that move within the space 10. Each of the robots 100 may be controlled to individually provide a service. Alternatively, the robots 100 may be controlled to move to a common destination within the space 10. The specific area 50 may be a confined area within the space 10 and may be, for example, an area with a somewhat narrow width for the robots 100 to travel, that is, drive, or with restriction for the plurality of robots 100 to simultaneously drive. For example, the specific area 50 may be a section within the space 10 through which each of the plurality of robots 100 is required to sequentially pass in line. That is, the specific area 50 refers to a part of a route through which the robots 100 need to drive, and may represent a section in which each of the robots 100 is required to sequentially pass in line.

In operation 620, for a first robot that enters the specific area 50 among the plurality of robots 100, the robot control system 120 may i) control the first robot to pass through the specific area 50 via a first point defined in the specific area 50 by the robot control system 120. Alternatively/additionally, the robot control system 120 may ii) trigger a specific area driving mode of the first robot and may control the first robot to pass through the specific area 50 in the specific area driving mode.

In the above method i), the first point may refer to a point within the specific area 50 defined by the robot control system 120 which is a point that is not occupied by another robot (to which the first robot may move). For example, the first point may be a point closest to an exit of the specific area 50 (or a point farthest from the first robot) among a variety of points that are not occupied by another robot (to which the first robot may move) within the specific area 50.

In operation 630, the robot control system 120 may control each robot such that each robot entering the specific area 50 after the first robot among the plurality of robots 100 may sequentially pass through the specific area.

Also, each robot entering the specific area 50 after the first robot may be controlled to drive in the specific area 50 and to pass through the specific area 50 according to the aforementioned method of i) and/or ii).

According to the aforementioned method i), the robot control system 120 may centrally control the robots 100 based on resource management corresponding to the specific area 50 such that the robots 100 may sequentially pass through the specific area 50 without interference.

Also, according to the aforementioned method ii), the robot control system 120 may trigger the specific area driving mode for each robot of the robots 100 entering the specific area 50, such that each robot may sequentially pass through the specific area 50 according to the specific area driving mode.

The method of centrally controlling the robots 100 such that the robots 100 may sequentially pass through the specific area 50 without interference of i) will be further described below with reference to FIGS. 7, 10, 12A-12F, and 14.

The method of ii) of triggering the specific area driving mode for each robot of the robots 100 such that the robots 100 may sequentially pass through the specific area 50 without interference will be further described below with reference to FIGS. 9, 11, and 13.

Description related to technical features made above with reference to FIGS. 1 to 5 may apply to FIG. 6 and thus, repeated description is omitted.

Figure 7:
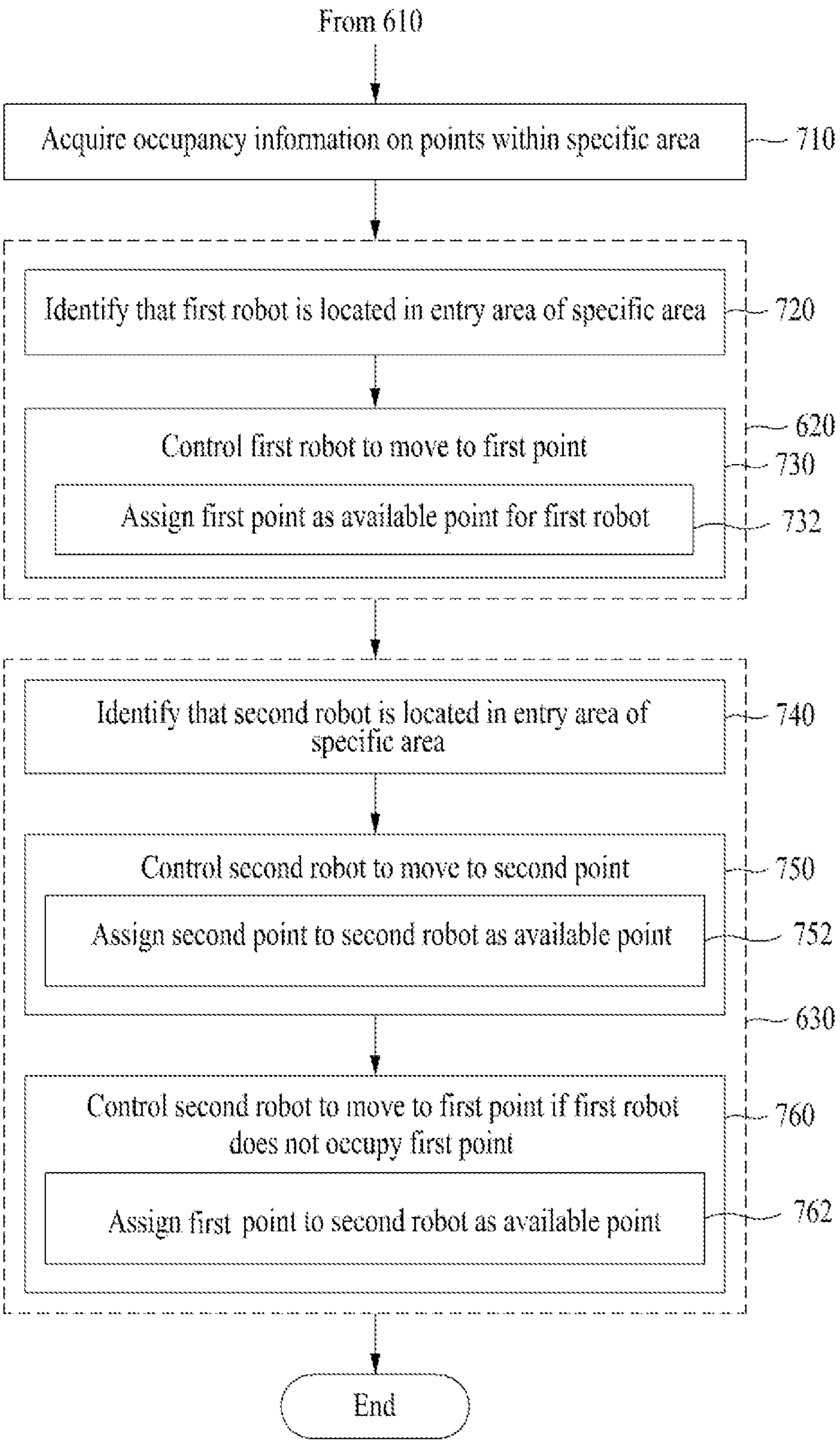
FIG. 7 is a flowchart illustrating a method of controlling a plurality of robots to pass through a specific area based on resource management for the specific area according to an example.

FIG. 7 is a flowchart illustrating a method of controlling a plurality of robots to pass through a specific area based on resource management for the specific area according to an example.

The method of centrally controlling the robots 100 such that the robots 100 may sequentially pass through the specific area 50 without interference of i) will be further described with reference to FIG. 7.

In operation 720, for the first robot that enters the specific area 50 among the plurality of robots 100, the robot control system 120 may identify that the first robot is located in an entry area of the specific area 50. The entry area may represent a point on an entrance side of the specific area 50. For example, as illustrated in FIGS. 12A-12F, the entry area may be an area (point) 30 ahead of the specific area 50. The robot control system 120 may determine whether the first robot is located in the entry area 30 of the specific area 50. For example, the robot control system 120 may identify whether the robot is located in the entry area 30 based on (robot) occupancy information related to the entry area 30.

Figure 12A:
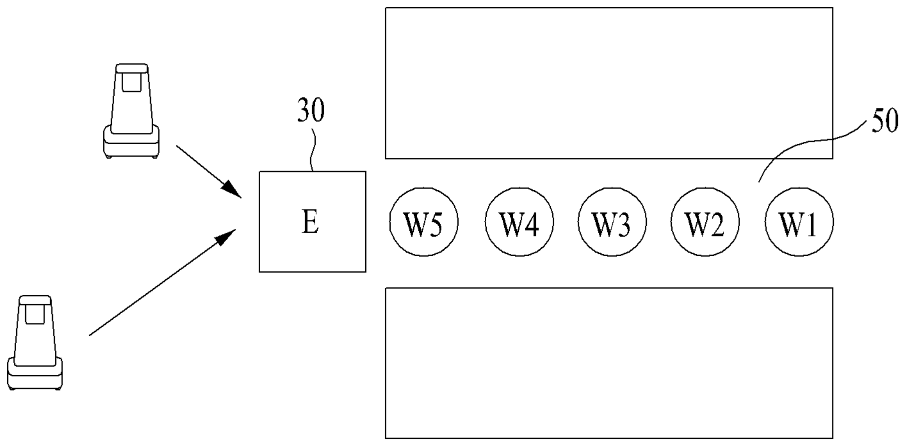
Figure 12B:
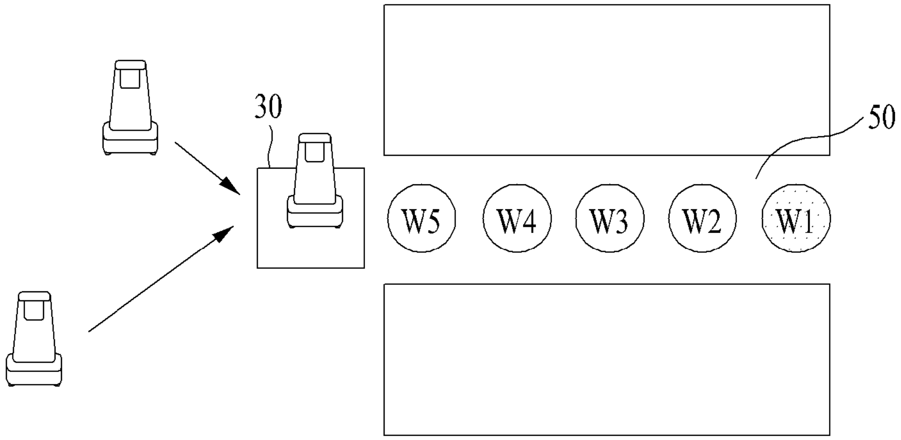

In operation 730, when the first robot is located in the entry area 30 (such as shown in FIG. 12B), the robot control system 120 may control the first robot to move to the first point defined in the specific area 50.

Figure 12C:
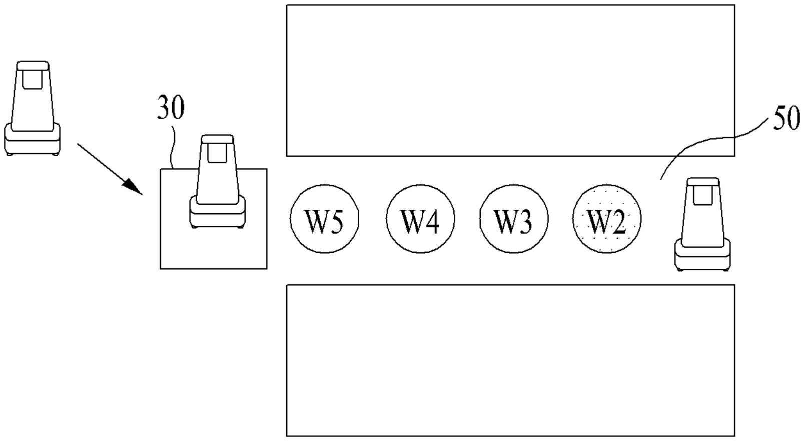

In operation 732, in controlling the first robot to move to the first point, the robot control system 120 may assign the first point to the first robot as an available point for the first robot among points defined in the specific area 50. The robot control system 120 may control the first robot to move to the assigned first point (such as shown in FIG. 12C).

The (assigned) first point refers to a point within the specific area 50 defined by the robot control system 120 and may represent a point not occupied by another robot to which the first robot may move. For example, the first point may be a point located next to a point occupied by another robot among the points defined in the specific area 50 (as a point to which the first robot may move) or a point farthest from the entry area 30 (e.g., a point corresponding to an exit location) among the points defined in the specific area 50. Although not occupied by the other robot, a point to which the first robot may not move due to blockage by the other robot may not become the first point. If the other robot is absent within the specific area 50, or if the first robot is a robot that first enters the entry area 30 among the plurality of robots 100, the first point may be a point (e.g., exit point) farthest from the entry area 30 among the points defined in the specific area 50.

In operation 740, the robot control system 120 may identify that a second robot is located in the entry area 30 after the first robot among the plurality of robots 100. The second robot may be a robot that passes through the specific area 50 after the first robot. The aforementioned description related to the method of identifying whether the first robot is located in the entry area 30 may be similarly applied to a method of identifying whether the second robot is located in the entry area 30 and thus, repeated description is omitted.

Figure 12D:
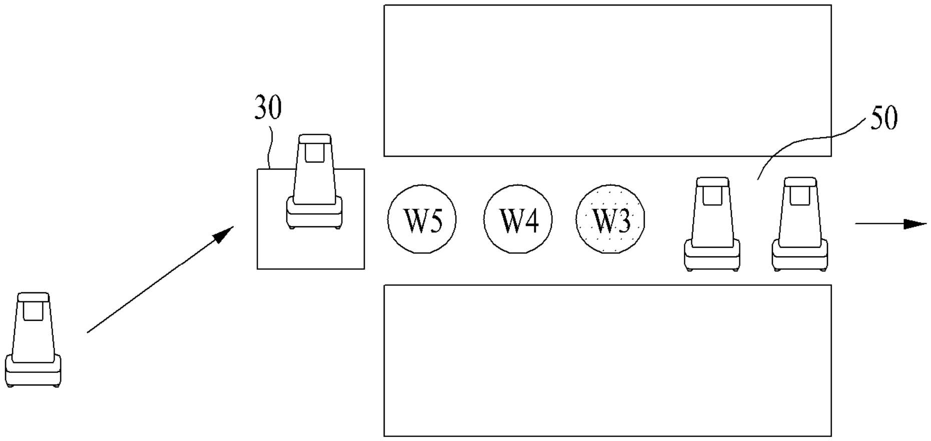

In operation 750, when the second robot is located in the entry area 30, the robot control system 120 may control the second robot to move to a second point located next to the first point occupied by the first robot among the points defined in the specific area 50 (such as shown in FIG. 12D). Since the second robot moves to the second point located next to the first point, the second robot may follow the first robot.

In operation 752, in controlling the second robot to move to the second point, the robot control system 120 may assign the second point to the second robot as an available point for the second robot among the points defined in the specific area 50. The robot control system 120 may control the second robot to move to the assigned second point.

The (assigned) second point refers to a point within the specific area 50 defined by the robot control system 120 and may be a point to which the second robot may move that is not occupied by another robot. For example, the second point may be a point located next to a point occupied by another robot among the points defined in the specific area 50 (as a point to which the second robot may move) or a point farthest from the entry area 30 among the points defined in the specific area 50. Although not occupied by the other robot, a point to which the second robot may not move due to blockage by the other robot can not become the second point. If the first point is a point farthest from the entry area 30 among the points defined in the specific area 50, the second point may be a farthest point next to the first point from the entry area 30 among the points defined in the specific area 50.

In operation 760, if the first robot moves in the specific area 50 (e.g., moves toward an exit location of the specific area 50) and accordingly, the first robot does not occupy the first point, the robot control system 120 may control the second robot to move to the (empty) first point.

In operation 762, in controlling the second robot to move to the first point, the robot control system 120 may assign the first point to the second robot as an available point for the second robot among the points defined in the specific area 50. The robot control system 120 may control the second robot to move to the assigned first point. That is, the second robot may move to a point that is empty in response to movement of the preceding first robot (point occupied by the first robot before movement).

In an example embodiment according to the aforementioned operations, if the first robot moves toward the exit location of the specific area 50, the following second robot may also move toward the exit location of the specific area 50 and accordingly, the first robot and the second robot may sequentially exit the specific area 50.

A robot that passes through the specific area 50 after the second robot (i.e., a robot located in the entry area 30 after the second robot) may be controlled in a similar manner to the aforementioned first robot and second robot.

Therefore, the plurality of robots 100 may exit the specific area 50 sequentially (in the order in which they are located in the entry area 30).

The aforementioned assignment of an available point within the specific area 50 for the first robot and the second robot may be performed based on (robot) occupancy information managed by the robot control system 120.

In operation 710, the robot control system 120 may acquire occupancy information on the specific area 50. For example, the robot control system 120 may acquire the occupancy information from a database that stores the occupancy information. The robot control system 120 may be configured to perform storage, reference, and update of the occupancy information and may manage the occupancy information accordingly.

For example, the robot control system 120 may acquire the occupancy information indicating whether each of the points defined in the specific area 50 is occupied by any of the robots 100. The robot control system 120 may determine an available point for a robot that enters the specific area 50 (i.e., located in the entry area 30) based on such occupancy information on each point and may assign the determined point to the corresponding robot. That is, the robot control system 120 may assign available points to the first robot and the second robot based on the occupancy information.

Meanwhile, the points within the specific area 50 may be points predefined in the specific area 50. That is, the aforementioned first point and second point may be points predefined in the specific area 50.

For the specific area 50 in the space 10 (or in the route through which the robots 100 drive), the robot control system 120 may predefine points included in the corresponding specific area 50 as points at which a robot passing through the specific area 50 is located (waiting). Each of the points may be a waypoint through which the robot needs to go to pass through the specific area 50. The robot control system 120 may connect and define the points in a graph form. Information on the defined points may be stored in the robot control system 120 or an external database.

Alternatively, the points in the specific area 50 may be not points that are predefined in the specific area 50 but are instead dynamically (i.e., variably) defined points. That is, the aforementioned first point and second point may be points dynamically defined in the specific area 50. For example, the aforementioned second point may be defined to be separate from the first point by a distance that is determined based on at least one of attribute information of the first robot and attribute information of the second robot.

In an example embodiment, only a line in which the robots 100 are located (e.g., robots wait in line) within the specific area 50 may be predefined, and a location of a point at which each of the robots 100 is located may be dynamically defined on the line. Here, occupancy information on the specific area 50 may represent a location of the line occupied by the robots 100.

The occupancy information may be configured to include information on a robot that occupies the specific area 50, and location information on a location occupied by the corresponding robot. When the occupancy information represents that a first location (first point) of the specific area 50 is occupied by the first robot, the robot control system 120 may determine a location separated from the first location by a distance that is determined based on attribute information of the first robot and/or attribute information of the second robot as the second point, and may assign the determined second point to the second robot.

Figure 14:
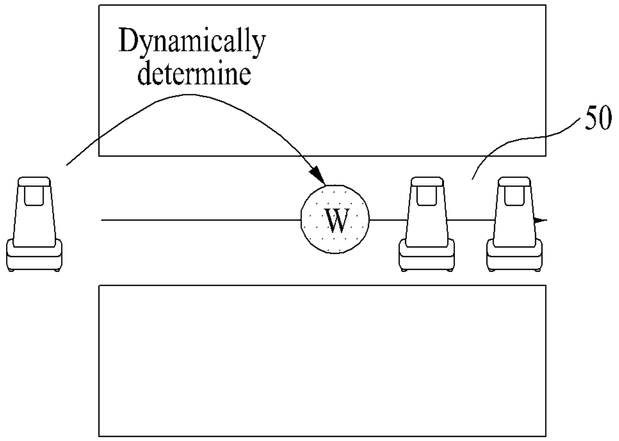
FIG. 14 illustrates a method of dynamically defining a point (waiting point) to which a robot is to move within a specific area in which a plurality of robots is to drive according to an example.

In this regard, FIG. 14 illustrates a method of dynamically defining a point (waiting point) to which a robot is to move within a specific area in which a plurality of robots are to drive according to an example.

As in the illustrated example, a point W within the specific area 50 to which a robot (following robot) needs to move may be dynamically (variably) determined.

A location of the point W may be determined based on an attribute of a following/preceding robot (where such an attribute includes, for example, at least one of a type of the robot, a size of the robot, and a service provided from the robot).

For example, when a size of the preceding robot and/or the following robot is large, when the service provided from the preceding robot and/or the following robot is high risk (e.g., a service that delivers hot liquid), or when a lot of space is required (e.g., a service that delivers bulky luggage), the location of the point W may be determined to be further away from the preceding robot than in other cases.

As described above, by determining a waiting point of the following robot entering the specific area 50 within the specific area 50 based on attributes of the corresponding following robot and/or the preceding robot, the robots 100 may more efficiently and flexibly pass through the specific area 50.

Hereinafter, a method of controlling a plurality of robots to pass through a specific area based on resource management for the specific area will be further described with reference to FIGS. 10 and 12A-12F.

Figure 10:
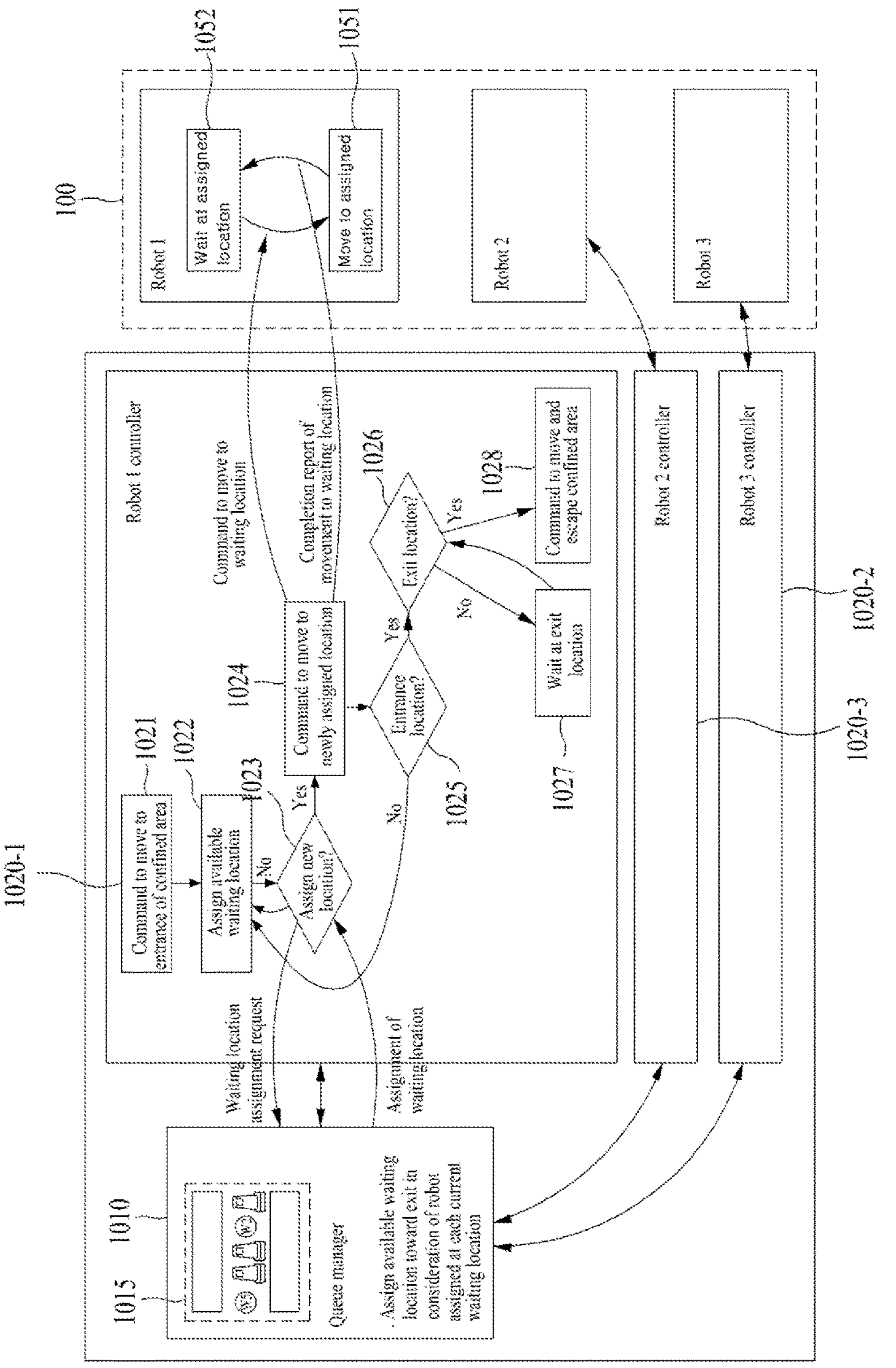
FIGS. 10 and 12A to 12F illustrate a method of controlling a plurality of robots to pass through a specific area based on resource management for the specific area according to an example.

A queue manager 1010 of FIG. 10 may be implemented through the queue management unit 510. Here, the term "queue" may represent the specific area 50 through which the robots 100 need to sequentially pass. The queue manager 1010 may assign an available point within the specific area 50 to a robot that enters the specific area 50 through resource management for the specific area 50. The queue manager 1010 may assign an available point (waiting point) to the robot that enters the specific area 50 based on (robot) occupancy information (that represents whether each point within the specific area 50 is occupied by a robot).

The queue manager 1010 may be an entity that manages spatial information of the specific area 50 to coordinate passage of the plurality of robots 100 (i.e., multiple robots) through the specific area 50.

Each of robot controllers (1020-1, 1020-2, and 1020-3) may be an agent-level controller that controls each associated robot 100.

Each of the illustrated robots may include a program (for autonomous driving and movement control) mounted to a corresponding robot.

As illustrated, a robot 1 controller 1020-1 that controls robot 1 may command robot 1 to move to an entrance (or the entry area 30) of the confined area that is the specific area 50 (1021), and may request the queue manager 1010 to assign a waiting location to be assigned with an available waiting location (point) (1022 and 1023).

When the waiting location within the confined area to which robot 1 is to move is assigned, the robot 1 controller 1020-1 may command robot 1 to move to the waiting location assigned to robot 1 (1024). Robot 1 may move to the assigned waiting location and may wait at the assigned waiting location (1051 and 1052).

The robot 1 controller 1020-1 may determine whether the waiting location of robot 1 corresponds to an exit location of the confined area and, when the waiting location does not correspond to the exit location, may assign a subsequent available waiting location (which may be repeated until robot 1 reaches the exit location), and when the waiting location corresponds to the exit location, may determine whether robot 1 may escape (exit) the confined area (1025 and 1026).

When robot 1 is incapable of escaping the confined area, the robot 1 controller 1020-1 may allow robot 1 to wait at the corresponding exit location. When robot 1 is capable of escaping the confined area, the robot 1 controller 1020-1 may command robot 1 to exit the corresponding confined area (1027 and 1028).

FIGS. 12A-12F illustrates an example of the robots 100 passing through the specific area 50 (confined area).

As illustrated, points W1 to W5 may be predefined points within the specific area 50.

As illustrated in FIGS. 12A to 12F, if a robot first entering the specific area 50 moves to the entry area 30 (FIG. 12B), the robot control system 120 may assign a farthest point W1 as an available waiting point of the corresponding robot and may move the robot to the point W1 (FIG. 12C).

Then, the point W2 (behind the point W1) may be assigned to a robot located in the entry area 30 as an available waiting point, and the robot control system 120 may move the corresponding robot to the point W2 (FIG. 12D.

Figure 12E:
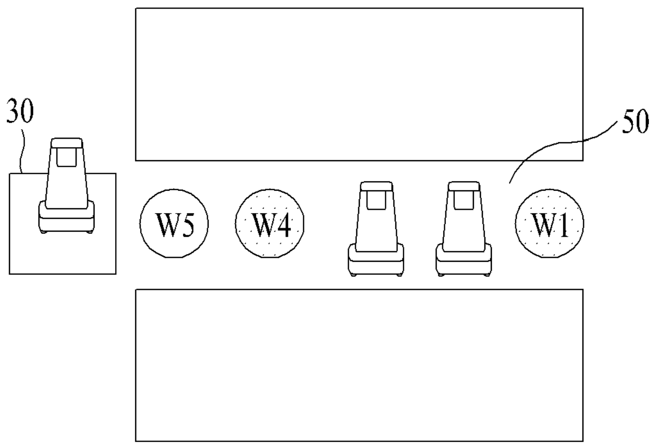
Figure 12F:
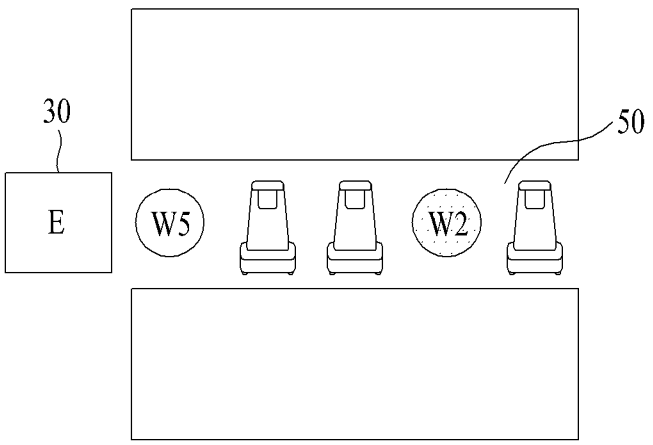

Then, the point W3 (behind the point W2) may be assigned to a robot located in the entry area 30 as an available waiting point and the robot control system 120 may move the corresponding robot to the point W3 (FIG. 12E). Meanwhile, if the robot that occupies the point W1 exits the specific area 50 (FIG. 12E), the robot control system 120 may assign the (empty) point W1 to the robot located at the point W2 as the available waiting point and may move the corresponding robot from point W2 to the point W1 (FIG. 12F). Then, the point W4 (behind the point W3 being occupied) may be assigned to a robot located in the entry area 30 as an available waiting point and the robot control system 120 may move the corresponding robot to the point W4 (FIG. 12F). The robot control system 120 may assign the (empty) point W2 to the robot located at the point W3 as an available waiting point and may move the corresponding robot to the point W2.

Therefore, the plurality of robots 100 may sequentially pass through the specific area 50.

Although FIGS. 12A-12F illustrate that available waiting points are sequentially allocated to robots and the robots sequentially exit the specific area 50 for clarity of description, the robot control system 120 (queue manager 1010) of an example embodiment may control the robots such that the robots may quickly exit the specific area 50 starting from a preceding robot, while continuously assigning new available points to robots located in the entry area 30 and a queue and, at the same time, may control the robots such that a robot in the specific area 50 may continue to move to an empty waiting point.

Description related to technical features made above with reference to FIGS. 1 to 6 may apply to FIGS. 7, 10, 12A-12F, and 14 and thus, repeated description is omitted.

Figure 9:
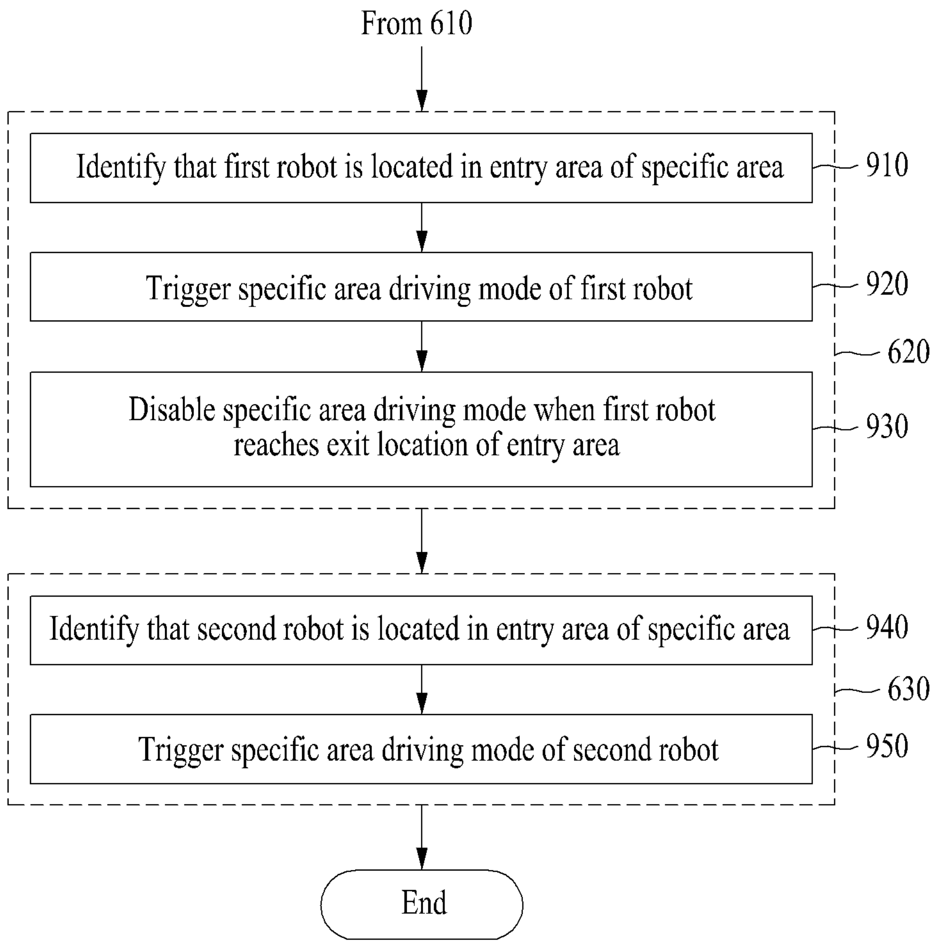
FIG. 9 is a flowchart illustrating a method of triggering a specific area driving mode for each robot entering a specific area and controlling a plurality of robots to pass through the specific area according to an example.

FIG. 9 is a flowchart illustrating a method of triggering a specific area driving mode for each robot entering a specific area and controlling a plurality of robots to pass through the specific area according to an example.

The aforementioned method of triggering a specific area driving mode for each robot of the robots 100 entering the specific area 50 such that each robot may sequentially pass through the specific area 50 according to the specific area driving mode of method ii) will be further described with reference to FIG. 9.

In operation 910, for a first robot that enters the specific area 50 among the plurality of robots 100, the robot control system 120 may identify that the first robot is located in the entry area 30 of the specific area 50. The aforementioned description related to operation 720 may be applied to operation 910 and thus, repeated description is omitted.

In operation 920, the robot control system 120 may trigger (activate) the specific area driving mode of the first robot. For example, the robot control system 120 may change a driving mode of the first robot from an autonomous driving mode (used for general route driving) to the specific area driving mode. The specific area driving mode of the robot may be a specific driving mode used to drive in the specific area 50, such as the confined area.

In this specific area driving mode, if another robot (i.e., a preceding robot) is absent from within the specific area 50, the first robot may be controlled to directly move to the exit location of the specific area 50. Here, the "exit location" may be a location (point) within the specific area 50 closest to the exit of the specific area 50. Meanwhile, if the other robot (i.e., the preceding robot) is present within the specific area 50, the first robot may be controlled to move to a location separated from the other robot that is present within the specific area 50 by a predetermined distance. The predetermined distance may be determined based on the attributes of the first robot and/or the preceding robot.

In operation 930, when the first robot reaches the exit location of the specific area 50, the robot control system 120 may disable the specific area driving mode of the first robot. For example, the robot control system 120 may again change the driving mode of the first robot from the specific area driving mode to the autonomous driving mode. Therefore, the first robot that exits the specific area 50 may again drive in the autonomous driving mode.

Hereinafter, an operation of a robot(s) that follows the first robot and passes through the specific area 50 is described.

In operation 940, the robot control system 120 may identify that a second robot after the first robot is located in the entry area 30 among the plurality of robots 100. The aforementioned description related to operation 740 may be similarly applied to operation 940 and thus, repeated description is omitted.

In operation 920, the robot control system 120 may trigger a specific area driving mode of the second robot. For example, the robot control system 120 may change a driving mode of the second robot from an autonomous driving mode (used for general route driving) to the specific area driving mode.

In the specific area driving mode, when the first robot is present within the specific area 50, the second robot may be controlled to move to a location separated from the first robot by a predetermined distance. The predetermined distance may be determined based on the attributes of the first robot (the preceding robot) and/or the second robot (the following robot). Alternatively, the predetermined distance may be a preset distance at which the first robot and the second robot do not collide or interfere with each other. Meanwhile, the second robot may be controlled to move to an empty space within the specific area, for example, a location (point) that was previously occupied by the first robot that opens up as the first robot moves within the specific area (i.e., moves toward the exit location). That is, as the first robot moves toward the exit location, the second robot may also be moved. Here, the second robot may be moved while maintaining a predetermined distance from the first robot.

When the second robot also reaches the exit location, the specific area driving mode may be disabled.

A robot that passes through the specific area 50 after the second robot (i.e., a robot located in the entry area after the second robot) may be controlled in a similar manner to the aforementioned first robot and second robot.

Therefore, the plurality of robots 100 may exit the specific area 50 sequentially (in the order in which they are located in the entry area 30).

As described above, an operation of controlling the robot (s) (the first robot and the second robot) in the specific area driving mode may be performed according to a logic implemented in a corresponding robot or a logic implemented in the robot control system 120. Alternatively, at least a portion of the operation of controlling the robot(s) (the first robot and the second robot) in the specific area driving mode may be performed according to the logic implemented in the corresponding robot.

For example, in the specific area driving mode, the first robot may be controlled to identify another preceding robot within the specific area 50, to move to a location separated from the other identified robot by a predetermined distance, and to move to the exit location of the specific area 50 as the other identified robot moves, without receiving an instruction for controlling the first robot from the robot control system 120. Also, an operation of the second robot in the specific area driving mode may be performed in a similar manner without a control instruction or intervention from the robot control system 120.

That is, an operation of a robot that drives in the specific area 50 in the specific area driving mode may be performed based on the logic implemented in the robot without intervention of the robot control system 120 that is a server.

Alternatively, an example embodiment may be implemented such that the robot control system 120 controls an operation of the robot in the specific area driving mode.

Meanwhile, the operation of the robot in the specific area driving mode according to an example embodiment may imitate the motion of persons that pass through the confined area. That is, the first robot and the second robot may be controlled to pass through the specific area 50 by imitating the motion of a plurality of persons that pass through the confined area in line in the specific area driving mode. The robots 100 may be controlled in a similar manner to the motion of persons that sequentially pass through a narrow passage or hallway in line and may pass through the specific area 50 corresponding to the confined area.

Hereinafter, a method of triggering a specific area driving mode for each robot entering a specific area and controlling a plurality of robots to pass through the specific area will be further described with reference to FIGS. 11 and 13A-13F.

Figure 11:
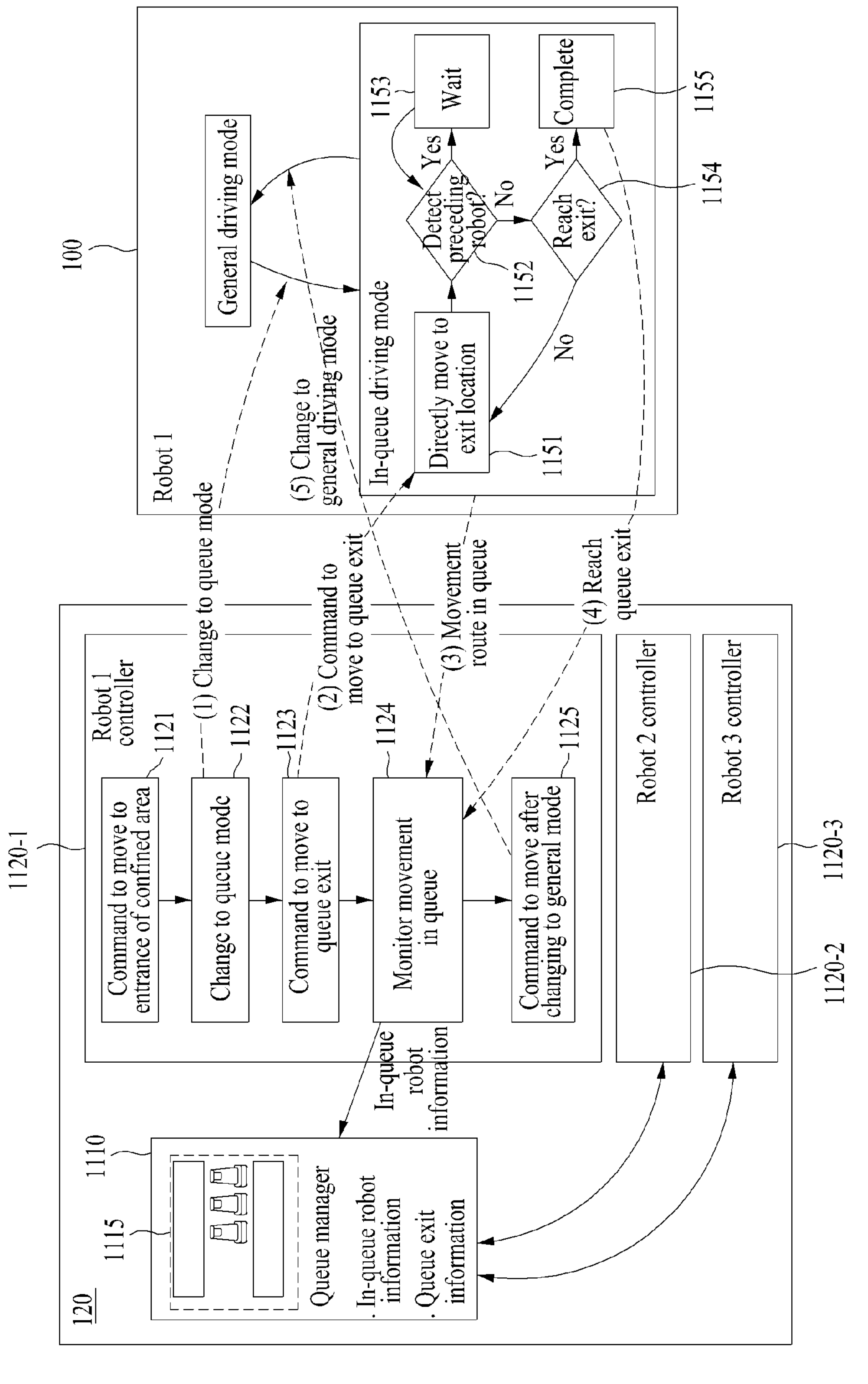
FIGS. 11 and 13A to 13F illustrate a method of triggering a specific area driving mode for each robot entering a specific area and controlling a plurality of robots to pass through the specific area according to an example.

A queue manager 1110 of FIG. 11 may be implemented through the aforementioned queue management unit 510. The queue manager 1110 may correspond to the queue manager 1010 described above with reference to FIG. 10. Here, the term "queue" may represent the specific area 50 through which the robots 100 need to sequentially pass. The queue manager 1110 may manage in-queue robot information 1115 and exit information of the queue (information on the exit location of the specific area 50). Information on the exit location may include, for example, information regarding whether the exit location is occupied by a robot and/or situation information outside the specific area 50.

The in-queue robot information 1115 may include information indicating locations of robots within the specific area 50 as well as information on the robots located in the specific area 50.

Each of the robot controllers (1120-1, 1120-2, and 1120-3) may be an agent-level controller that controls, respectively, each of the robots 100.

The illustrated robot may be a program (for autonomous driving and movement control) mounted to the robot.

As illustrated, a robot 1 controller 1120-1 that controls robot 1 may command robot 1 to move to an entrance (or the entry area 30) of the confined area that is the specific area 50 (1121), and may trigger a queue mode (in-queue driving mode) (the aforementioned specific area driving mode) of robot 1. That is, the robot 1 controller 1120-1 may change a driving mode of robot 1 from a general driving mode to the queue mode (in-queue driving mode) (1122). Therefore, the robot 1 controller 1120-1 may command robot 1 to move to the exit location (1123).

Robot 1 may move to the exit location according to the in-queue driving mode (1151) and may detect whether a preceding robot is present (1152). When the preceding robot is detected, robot 1 may wait at a location separate from the preceding robot by a predetermined distance (1153). When the preceding robot is not detected or when the preceding robot moves, robot 1 may continue to move to the exit location. Operations 1151 to 1154 may be repeated until robot 1 reaches the exit location.

Movement of robot 1 to the exit location may be monitored by the robot 1 controller 1120-1 (1124). Such monitoring information may be transmitted to the queue manager 1110 as in-queue robot information.

When an operation of the robot at the exit location is verified, the robot 1 controller 1120-1 may disable the queue mode of robot 1 and may change the driving mode to the general driving mode. Therefore, robot 1 may pass through the queue and may be controlled in the general driving mode.

As illustrated, an operation of the robot in the in-queue driving mode (specific area driving mode) may be performed without a control instruction from the robot control system 130.

For example, a robot that desires to pass through the specific area 50 may move to the entry area 30 of the specific area 50 under control from the robot control system 120. The robot may change the (preset) autonomous driving mode of the robot to the specific area driving mode according to a trigger by the robot control system 120. As the driving mode is changed to the specific area driving mode, the robot may determine whether another preceding robot is present within the specific area 50 and, if the other robot is absent from within the specific area 50, the robot may directly move to the exit location of the specific area 50. When the other robot (preceding robot) is present within the specific area 50, the robot may move to a location separated from the other robot by a predetermined distance.

When the other robot (that is the preceding robot within the specific area 50) is present, the robot may move to an empty space, that is, a location that was occupied by the preceding robot within the specific area 50 that occurs as the corresponding other robot moves, such as when it moves to the exit location (i.e., toward the exit location) of the specific area 50.

When the robot reaches the exit location of the specific area 50, the robot may change the (set) specific area driving mode to the autonomous driving mode under control from the robot control system 120. Therefore, the robot may operate in the autonomous driving mode after exiting the specific area 50.

FIGS. 13A-13F illustrate an example of the robots 100 passing through the specific area 50 (confined area).

The robots 100 may be controlled by receiving information (route planning) on a route and a mode change trigger (i.e., mode change trigger to a specific area driving mode) from the robot control system 120.

Figure 13A:
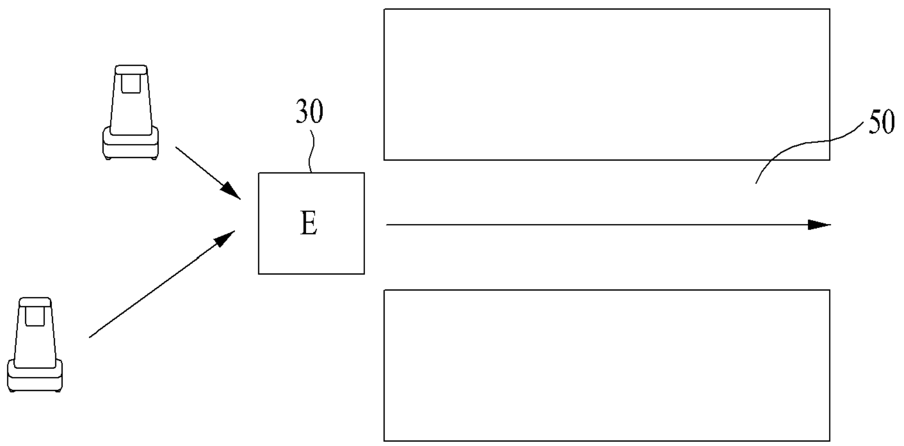
Figure 13B:
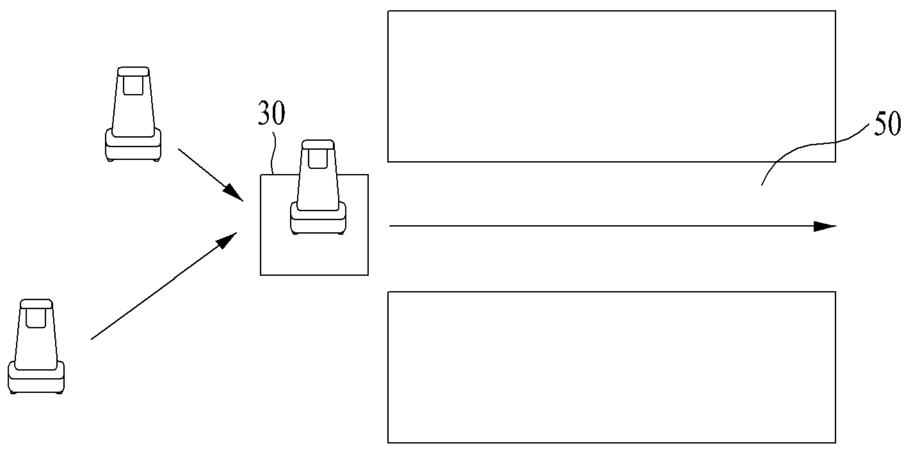
Figure 13C:
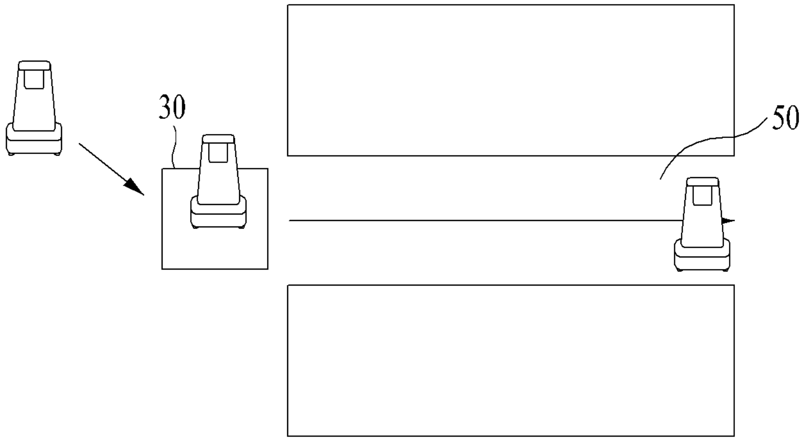
Figure 13D:
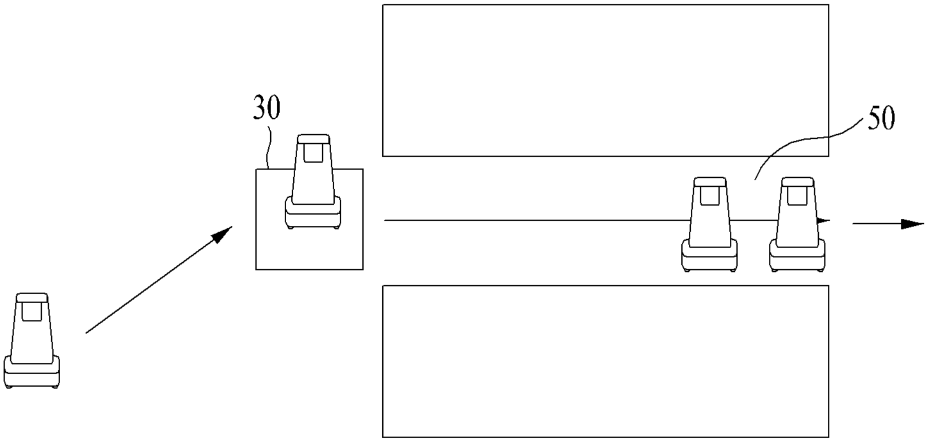
Figure 13E:
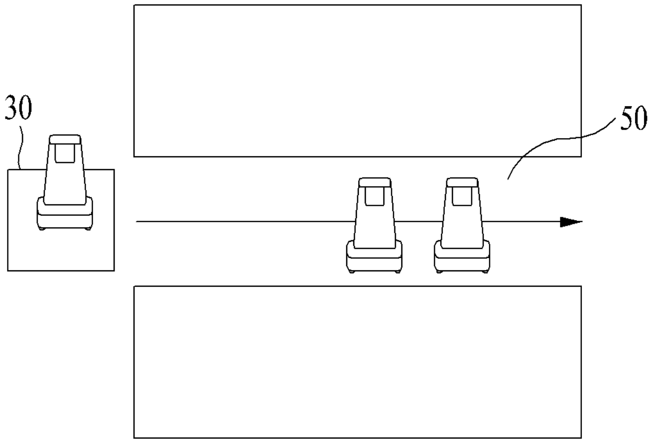
Figure 13F:
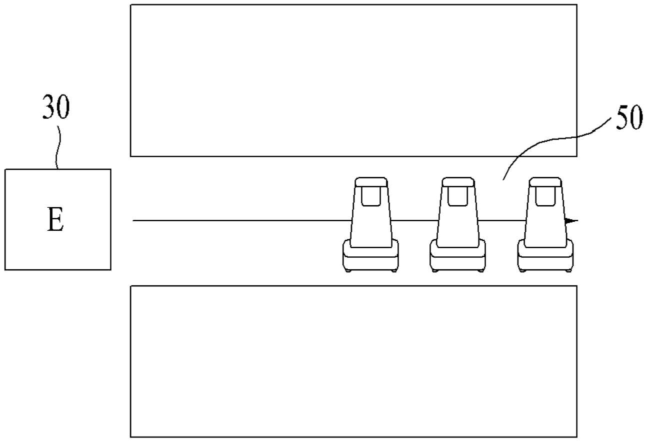

As illustrated in FIGS. 13A to 13F, if a robot first entering the specific area 50 moves to the entry area 30, the robot control system 120 may change a driving mode of the corresponding robot to the specific area driving mode and may directly move to the exit location since a preceding robot is absent (see FIGS. 13A to 13C). If the next robot is located in the entry area 30, the robot control system 120 may change a driving mode of the corresponding robot to the specific area driving mode and the robot may wait behind the preceding robot since the preceding robot is present (see FIGS. 13C and 13D). If the next robot is located in the entry area 30, the robot control system 120 may change a driving mode of the corresponding robot to the specific area driving mode and the robot may wait behind the preceding robot since the preceding robot is present. Here, if the robot that occupies the exit location exits the specific area 50, the following robots may move as if the robots are being pushed toward the exit (see FIGS. 13D to 13F).

By performing this operation for the robots 100, the robots 100 may line up and pass through the specific area 50.

FIGS. 13A-13F separately describe the sequential movement of a robot for clarity of description. However, in an example embodiment, the robot control system 120 may continuously move robots occupying the exit location to exit the specific area 50 one by one based on situation information outside the specific area 50 and, when an empty space occurs within the specific area 50, may control the robots 100 such that the robots within the specific area 50 may simultaneously move toward the exit location and fill the empty space. Therefore, the robots may pass through the specific area 50 in a similar manner in which persons line up and pass through a narrow passage.

Description related to technical features made above with reference to FIGS. 1 to 7, 10, 12A-12F, and 14 may apply to FIGS. 9, 11, and 13A-13F and thus, repeated description is omitted.

Figure 8:
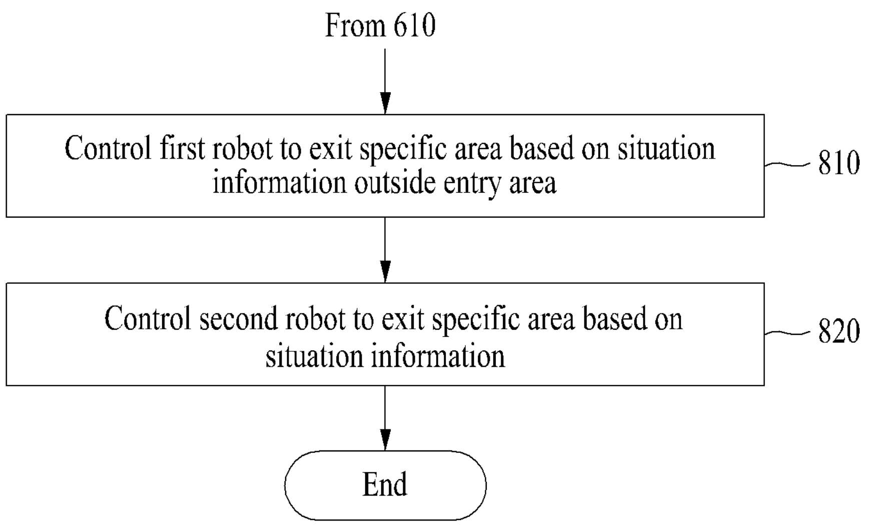
FIG. 8 is a flowchart illustrating a method of controlling a corresponding robot driving within a specific area to exit the specific area according to an example.

FIG. 8 is a flowchart illustrating a method of controlling a corresponding robot driving in a specific area to exit the specific area according to an example.

A method of exiting, by a robot moved to the exit location of the specific area 50 according to the aforementioned method, the specific area 50 will be further described with reference to FIG. 8.

Under central control from the robot control system 120 in method i) or under control in the specific area driving mode in method ii), the robot may drive in the specific area 50 and may reach the exit location of the specific area 50. The "exit location" may be, for example, a location (point) within the specific area 50 closest to the exit of the specific area 50.

In operation 810, the robot control system 120 may control the robot to exit the specific area 50 from the exit location of the specific area 50 based on situation information outside the specific area 50. For example, when the robot (the robots 100 including the first robot or the second robot) drives in the specific area 50 and accordingly, reaches the exit location of the specific area 50, the robot control system 120 may control the robot to exit the specific area 50 from the exit location based on the situation information.

In operation 820, for a robot that enters the specific area 50 after the robot exits the specific area 50 in operation 810, the robot control system 120 may control the corresponding robot to move to a location occupied by the robot having previously exited the specific area 50 and then to exit the specific area 50 from the exit location based on the situation information.

That is, when a preceding robot exits the specific area 50, the following robot may be controlled to move to a location previously occupied by the preceding robot and to exit the specific area 50 from the exit location. The location occupied by the preceding robot may be an exit location.

Therefore, the robots 100 may sequentially exit the specific area 50 based on situation information outside the specific area 50.

The situation information outside the specific area 50 may include a congestion level outside the specific area 50, that is, around the exit location. For example, if a congestion level in an area around the exit location is less than a predetermined value (e.g., if the number of obstacles, such as robots and persons, is less than a predetermined value), the robot control system 120 may allow the robot to exit the specific area 50. That is, when the situation information represents that the robot is capable of exiting the specific area 50, the robot control system 120 may allow the robot to escape the specific area 50.

The robot control system 120 may generate situation information based on at least one of location information of each of the robots being monitored, location information of each of the persons being monitored, an indoor map of the space 10 used for route planning of the robots, and video information acquired from closed-circuit television (CCTV) installed in the space 10. For example, the robot control system 120 may compute a congestion level of a corresponding area by analyzing a video from the CCTV that captures an area near the exit location, and may use the computed congestion level as the situation information.

Description related to technical features made above with reference to FIGS. 1 to 7 and FIGS. 9 to 14 may apply to FIG. 8 and thus, repeated description is omitted.

The systems or the apparatuses described herein may be implemented using hardware components, software components, or some combinations of the hardware components and the software components. For example, the apparatuses and the components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be embodied in any type of machine, component, physical equipment, virtual equipment, a computer storage medium or device, to be interpreted by the processing device or to provide an instruction or data to the processing device. The software also may be distributed over network coupled computer systems so that the software is stored and executed in a distributed fashion. The software and data may be stored by one or more computer readable storage media.

The methods according to the above-described example embodiments may be configured in a form of program instructions performed through various computer devices and recorded in computer-readable media. The media may include, alone or in combination with program instructions, a data file, a data structure, and the like. The program instructions stored in the media may be specially designed and configured for the example embodiments or may be known and available for one skilled in computer software art. Examples of the media include magnetic media such as hard disks, floppy disks, and magnetic tapes; optical media such as CD-ROM and DVDs; magneto-optical media such as floptical disks; and hardware devices that are specially configured to store program instructions, such as read-only memory (ROM), random access memory (RAM), flash memory, and the like. Examples of the program instructions include a machine language code produced by a compiler and an advanced language code executable by a computer using an interpreter.

Although the example embodiments are described with reference to some specific example embodiments and accompanying drawings, it will be apparent to one of ordinary skill in the art that various alterations and modifications in form and details may be made in these example embodiments without departing from the spirit and scope of the claims and their equivalents. For example, suitable results may be achieved if the described techniques are performed in different order, and/or if components in a described system, architecture, device, or circuit are combined in a different manner, and/or replaced or supplemented by other components or their equivalents.

Therefore, other implementations, other example embodiments, and equivalents of the claims are to be construed as being included in the claims.

What is claimed is:

1. A robot control method performed by a robot control system that controls a plurality of robots moving in a space, the robot control method comprising:

identifying a specific area through which the plurality of robots are to pass, wherein the specific area is a section within the space of a narrowed width such that the plurality of robots can only pass therethrough sequentially in a line, and further wherein the specific area includes an entry side and an exit side that is on an opposite end of the entry side;

for a first robot that enters the specific area, wherein the first robot is one of the plurality of robots: controlling the first robot to pass through the specific area via a first point defined in the specific area by the robot control system, controlling each robot entering the specific area after the first robot among the plurality of robots to sequentially pass through the specific area, and wherein the controlling of the first robot comprises:

identifying that the first robot is located in an entry area of the specific area, wherein the entry area is outside of the specific area, and is closer to the entry side of the specific area than to the exit side of the specific area; and controlling the first robot to move to, and stop at, the first point, without stopping at another point within the specific area prior to reaching the first point, wherein the first point is a point to which the first robot is movable and is a point farthest from the entry area, such that the first point is located closer to the exit side of the specific area than to the entry side of the specific area, and the controlling of each robot comprises:

identifying that a second robot is located in the entry area after the first robot, wherein the second robot is one of the plurality of robots; and controlling the second robot to move to, and stop at, a second point located adjacent to the first point occupied by the first robot, wherein the second point is located within the specific area and is between the first point and the entry side of the specific area, wherein the second robot passes through the entry side of the specific area before arriving at the second point, and wherein the first point and the second point are points dynamically defined in the specific area, and further wherein the second point is defined to be separated from the first point by a distance that is determined based on attribute information of the first robot and attribute information of the second robot, and wherein the attribute information includes a size of the first robot and a size of the second robot.

2. The robot control method of claim 1, wherein the controlling of each of the plurality of robots comprises controlling the second robot to move to the first point if the first robot moves within the specific area and does not occupy the first point.

3. The robot control method of claim 2, wherein:

the controlling of the first robot to move to the first point comprises:

assigning the first point to the first robot as an available point for the first robot; and controlling the first robot to move to the assigned first point, the controlling of the second robot to move to the second point comprises:

assigning the second point to the second robot as an available point for the second robot; and controlling the second robot to move to the assigned second point, and the controlling of the second robot to move to the first point comprises:

assigning the first point to the second robot as an available point for the second robot; and controlling the second robot to move to the assigned first point.

4. The robot control method of claim 3, wherein the first point and the second point are points predefined in the specific area, the robot control method further comprises:

acquiring occupancy information indicating whether each of the first and second points is occupied by any of the plurality of robots, and an available point for the first robot and the second robot is assigned based on the occupancy information.

5. The robot control method of claim 1, wherein the controlling of the first robot comprises controlling the first robot to exit the specific area from the exit side of the specific area based on situation information outside the specific area, and the second robot that enters the specific area after the first robot is controlled to move to a location occupied by the first robot and then controlled to exit the specific area from the exit side based on the situation information, wherein the second robot is one of the plurality of robots.

6. The robot control method of claim 1, wherein the attribute information includes information indicating a risk level of a service provided by a robot, and the distance is determined to be greater as the risk level of the service provided by the first robot or the second robot increases.

7. A computer program stored in a non-transitory computer-readable recording medium to execute the method according to claim 1 in the robot control system that is a computer system.

8. A non-transitory computer-readable recording medium storing a program to execute the method according to claim 1 in the robot control system that is a computer system.

9. A robot control system that controls a plurality of robots moving in a space, the robot control system comprising:

at least one processor configured to execute a computer-readable instruction, wherein the at least one processor is configured to identify a specific area through which the plurality of robots are to pass, to, for a first robot that enters the specific area, wherein the first robot is one of the plurality of robots, control the first robot to pass through the specific area via a first point defined in the specific area by the robot control system, and to control each robot entering the specific area after the first robot among the plurality of robots to sequentially pass through the specific area, wherein the specific area is a section within the space of a narrowed width such that the plurality of robots can only pass therethrough sequentially in a line, and further wherein the specific area includes an entry side and an exit side that is on an opposite end of the entry side, wherein the controlling of the first robot comprises:

identifying that the first robot is located in an entry area of the specific area, wherein the entry area is outside of the specific area, and is closer to the entry side of the specific area than to the exit side of the specific area; and controlling the first robot to move to, and stop at, the first point, without stopping at another point within the specific area prior to reaching the first point, wherein the first point is a point to which the first robot is movable and is a point farthest from the entry area, such that the first point is located closer to the exit side of the specific area that to the entry side of the specific area, and the controlling of each robot comprises:

identifying that a second robot is located in the entry area after the first robot, wherein the second robot is one of the plurality of robots; and controlling the second robot to move to, and stop at, a second point located adjacent to the first point occupied by the first robot, wherein the second point is located within the specific area and is between the first point and the entry side of the specific area, wherein the second robot passes through the entry side of the specific area before arriving at the second point, and wherein the first point and the second point are points dynamically defined in the specific area, and further wherein the second point is defined to be separated from the first point by a distance that is determined based on attribute information of the first robot and attribute information of the second robot, and wherein the attribute information includes a size of the first robot and a size of the second robot.

10. A building, comprising:

a plurality of robots providing a service while driving in the building is provided, the robots are controlled by a robot control system, the robot control system comprises at least one processor configured to execute a computer-readable instruction, and the at least one processor is configured to identify a specific area through which the robots are to pass, and for a first robot that enters the specific area, wherein the first robot is one of the plurality of robots, control the first robot to pass through the specific area via a first point defined in the specific area by the robot control system, and to control each robot entering the specific area after the first robot among the plurality of robots to sequentially pass through the specific area, wherein the specific area is a section within the space of a narrowed width such that the plurality of robots can only pass therethrough sequentially in a line, and further wherein the specific area includes an entry side and an exit side that is on an opposite end of the entry side, wherein the controlling of the first robot comprises:

identifying that the first robot is located in an entry area of the specific area, wherein the entry area is outside of the specific area, and is closer to the entry side of the specific area than to the exit side of the specific area; and controlling the first robot to move to, and stop at, the first point, without stopping at another point within the specific area prior to reaching the first point, wherein the first point is a point to which the first robot is movable and is a point farthest from the entry area, such that the first point is located closer to the exit side of the specific area that to the entry side of the specific area, and the controlling of each robot comprises:

identifying that a second robot is located in the entry area after the first robot, wherein the second robot is one of the plurality of robots; and controlling the second robot to move to, and stop at, a second point located adjacent to the first point occupied by the first robot, wherein the second point is located within the specific area and is between the first point and the entry side of the specific area, wherein the second robot passes through the entry side of the specific area before arriving at the second point, and wherein the first point and the second point are points dynamically defined in the specific area, and further wherein the second point is defined to be separated from the first point by a distance that is determined based on attribute information of the first robot and attribute information of the second robot, and wherein the attribute information includes a size of the first robot and a size of the second robot.

* * * * *